United States Patent [19]
Howard

[11] Patent Number: 5,963,733
[45] Date of Patent: Oct. 5, 1999

[54] METHOD AND SYSTEM FOR SIMULATING FOREST MANAGEMENT

[75] Inventor: Richard T. Howard, Troutdale, Oreg.

[73] Assignee: Assisi Software Corporation, Troutdale, Oreg.

[21] Appl. No.: 08/970,364

[22] Filed: Nov. 14, 1997

Related U.S. Application Data

[60] Provisional application No. 60/031,826, Nov. 26, 1996.
[51] Int. Cl.⁶ .................................................. G06F 17/60
[52] U.S. Cl. ........................................................ 395/500.27
[58] Field of Search ............................................. 364/578

[56] References Cited

U.S. PATENT DOCUMENTS 5,719,795   2/1998   Menkus et al. ......................... 364/578

OTHER PUBLICATIONS

Jianguo Liu, ECOLECON: An ECOLogical–ECONomic model for species conservation in complex forest landscapes, Ecological Modeling, 70 (1993) pp. 63–87, Jul. 3, 1992.

Arny, James A., Hands–on Forest Inventory & Forest Planning Workbook, Forest Biometrics, Gresham, Oregon, 1997, pp. 1 to 119.

Bell, John F. & Dilworth, J. R., Log Scaling and Timber Cruising, Oregon State University Book Stores, Inc., Corvallis, Oregon, 1993, Section II–pp. 6 to 31, pp. 52 to 57, Section IV–pp. 117 to 141.

Curtis, R. O., A Simple Index of Stand Density for Douglas–Fir, Forest Science 1982, pp. 92–94.

Hann, David W. & Zumrawl, Abdel A., Diameter Growth Equations for Douglas–Fir and Grand Fir in the Western Williamette Valley of Oregon, Forest Research Laboratory, Corvalis, Oregon, Apr. 1993, pp. 2 to 7, and Back cover of Book.

Hann, David W. & Wang, C. H., Mortality Equations for Individual Trees in The Mixed–Conifer Zone of Southwest Oregon, Forest Research Laboratory, Oregon State University, Corvalis, Oregon, Feb. 1990, pp. 1–18.

Hann, David W. & Larsen, David R., Diameter Growth Equations for Fourteen Tree Species in Southwest Oregon, Forest Research Laboratory, Oregon State University, Corvalis, Oregon, Jan. 1991, pp. 1–19.

Klemperer, David W., Forest Resource Economics and Finance, McGrall Hill, New York, New York, 1996, Chapter 4, pp. 101–133, Chapter 6, pp. 169–201.

Krajicek, J. E., Brinkman, K. A. & Gingrich, S. F., Crown Competition—A Measure of Density, Forest Science, 1961, pp. 35–42.

(List continued on next page.)

Primary Examiner—Kevin J. Teska
Assistant Examiner—Lonnie Knox
Attorney, Agent, or Firm—McDonnell Boehnen Hulbert & Berghoff

[57] ABSTRACT

Method and system for simulating forest management is provided. The forestry simulation system includes a library of object-oriented modules for simulating forest resources and various forestry management actions. The method includes initiating a simulation of forest resources over a pre-determined period of time using the object-oriented forest resource modules and description of forest resources such as trees and stands. Forestry management actions are periodically applied to the simulated forest resources. The object-oriented forestry simulation system also includes a windowed graphical user interface that is used to view multiple forestry management factors as the forestry simulation progresses. The method and system use object-oriented technologies to create a library of programmable components that is comprehensive, customizable and reflective of real world forest management. The method and system simulate many aspects of forest management simultaneously including: forestry operations, organization cash flow, multiple land use management and environmental quality.

22 Claims, 12 Drawing Sheets

OTHER PUBLICATIONS

Larsen, David W. & Hann, David W., Height–Diameter Equations for Seventeen Tree Species in Southwest Oregon, Forest Research Laboratory, Oregon State University, Corvalis, Oregon, Jan. 1987, pp. 1–17.

Paine, David P. & Hann, David W., Maximum Crown–Width Equations for Southwestern Oregon Tree Species, Forest Research Laboratory, Oregon State University, Corvalis, Oregon, Oct. 1982, pp. 1–21.

Richie, Martin W. & Hann, David W., Equations for Predicting Height to Crown Base for Fourteen Tree Species in Southwest Oregon, Mar. 1987, Forest Research Laboratory, Oregon State University, Corvalis, Oregon, pp. 1–15.

Smith, David M., Larson, Bruce C., Kelty, Mathew J. & Ashton, P. Mark S., The Practice of Silviculture: Applied Forest Ecology, John Wiley & Sons, Inc., New York, New York, 1997, Capter 4, pp. 69–98, Chapter 5, pp. 99–130.

Wang, Chao–Huan & Hann, David W., Height–Diameter Equations for Sixteen Tree Species in the Central Western Willamette Valley of Oregon, Forest Research Laboratory, Oregon State University, Corvalis Oregon, Jan. 1988, pp. 1–9.

Zunrawi, Abdel Azim & Hann, David W., Equations for Predicting the Height to Crown Base of Six Tree Species in the Central Western Willamette Valley of Oregon, Mar. 1989, Forest Research laboratory, Oregon State University, Corvalis, Oregon, pp. 1–11.

H.K. Koesmarno, E. G. Mason, and A. G. D. Whyte, Computer Techniques in Environmental Studies, "Object–oriented Software for Size–class Distributions of Tree Crops", pp. 384 to 393, 1994.

H. K. Koesmarno, E. G. Mason, and A. G. D. Whyte, Mathl. Comput. Modeling, "Object–Oriented Software for Modeling Growth and Size–Class Distributions of Tree Crops: An Overview of the Design", vol. 20, No. 8, pp. 65 to 74, 1994.

H. Salminen, H. Saarenmaa, J. Perttunen, R. Sievanen, J. Vakeva, and E. Nikinmaa, Mathl. Comput. Modeling, "Modelling Trees Using and Object–Oriented Scheme", vol. 20, No. 8, pp. 49 to 64, 1994.

Liu, Jianguo, Ecological Modelling, ECOLON: An ECOLogical–ECONomic Model for Species Conservation in Coplex Forest Landscapes, Elsevier Science Publishers, B. V., Amsterdam, 1993, pp. 63–87.

FIG. 11

```
ASSISI FOREST 98 - D:\DATABASE\ASSISIFORESTSAMPLEDATABASE.MDB                                   ─ 142
FILE  EDIT  VIEW  RUN  TOOLS  WINDOW
SETUP RUN STEP STOP CLEAR STOP PERIOD 20 CURRENT PERIOD 20 STATUS FINISHED         ─ 144
```

| STANDING VOLUME BY STAND, TREE CLASS AND LOG VIEWER | MANAGEMENT VIEWER |
|---|---|

STAND 85 SAMPLE | MANAGEMENT PLAN
VOLUME STANDING BY STAND, TREE CLASS AND LOG | 11/11/97 5:43:02 PM
DATABASE: D:\DATABASE\ASSISIFORESTSAMPLEDATABASE.MDB | PLAN:BUCKET PLAN, EVEN FLOW
PLAN: BUCKET PLAN, EVEN FLOW
VOLUME TYPE: BOARD, SCRIBNER DECIMAL C /AC | PERIOD STAND ACTION RULE
PERIOD=20   STAND=85   AC=7.440 | COMMENTS

GRAND FIR WWO | DBH: 15.145  HT: 89.929  TPA: 76.0

| LOG | DIAM | LEN | TOTAL | GROSS | NET |
|---|---|---|---|---|---|
| 1 | 9  | 32 | 9.780 | 9.780 | 9.780 |
| 2 | 5  | 32 | 3.924 | 0.000 | 0.000 |
| 3 | 6  | 4  | 0.964 | 0.000 | 0.000 |

DOUGLAS FIR WWO | DBH: 22.690  HT: 118.287  TPA: 86.8

| LOG | DIAM | LEN | TOTAL | GROSS | NET |
|---|---|---|---|---|---|
| 1 | 15 | 32 | 28.916 | 28.916 | 28.916 |
| 2 | 11 | 32 | 14.897 | 14.897 | 14.897 |
| 3 | 5  | 32 | 3.924  | 0.000  | 0.000  |
| 4 | 6  | 3  | 0.848  | 0.000  | 0.000  |

― 146

Management plan entries (― 148):

```
1  89  CLEAR CUT       CABLE
1  93  CLEAR CUT       CABLE
1  89  PLANT           FIR
1  93  PLANT           FIR
1  90  THIN 1ST COMMERCIAL 3  89  THIN  PRE-COMMERCIAL
3  93  THIN  PRE-COMMERCIAL 6  88  CLEAR CUT       CABLE
6  84  CLEAR CUT       CABLE
6  88  PLANT           FIR
6  84  PLANT           FIR 7  92  CLEAR CUT       CABLE
7  92  PLANT           FIR 8  86  CLEAR CUT       CABLE
8  86  PLANT           FIR
```

METHOD AND SYSTEM FOR SIMULATING FOREST MANAGEMENT

CROSS REFERENCES TO RELATED APPLICATIONS

This Utility Application claims priority from Provisional application No. 60/031,826 filed Nov. 26, 1996.

FIELD OF INVENTION

The present invention relates to computer simulation. More specifically, it relates to a method and system for simulating forest management.

BACKGROUND AND SUMMARY OF THE INVENTION

Computer simulations have been used for a number of years in forestry management. There are a number of different computer simulations known in the art that are used for forestry management. Forest inventory systems provide for a picture of timber resources at a specific moment in time. Forestry growth systems with mathematical growth models provide a way of simulating tree growth. Harvest schedule systems produce harvest and planting schedules find optimum harvest schedules for one or more stands of trees.

These forestry simulation tools have proven effective for specific applications, but they are difficult to use and customize. There are also a number of problems associated with using forestry simulations systems known in the art. Some of forestry simulation systems require a forestry manager input a large data file as batch job on a large mainframe computer and cannot be used on a time-shared computer. The batch forestry simulation may run for a significant amount of time, and the forestry simulation results are not instantaneous, but are delayed by some time period (e.g., a half-hour).

Other forestry simulation systems are used on personal computers but are application specific and are not designed to simulate more than one or two aspects of forest management at one time. Forestry simulation systems know in the art and used on personal computers are also written in programming languages like the C programming language that do not allow re-use of source code modules and are not easily adaptable. The forestry simulation systems known in the art typically do not have a graphical user interface that allow easy interaction with the underlying forestry simulation systems.

Today's forest manager should consider many complex factors simultaneously when managing forested land. Forestry management systems known in the art that consider one or two forestry management factors in isolation have proved to be ineffective in many situations to make accurate predictions for the management of forest lands.

Complex factors such as timber management, wildlife management, recreation, environmental quality and others are interrelated and need to be simulated together and not in isolation. Forestry simulations known in the art do not address today's complex forest management needs. The effective management of forest resources for multiple use has been hampered by a dearth of good simulation tools that can effectively consider multiple goals simultaneously.

In accordance with an illustrative embodiment of the present invention, the problems associated with simulating forestry management are overcome. A method and system are provided for simulating forestry management with an object-oriented forestry simulation that takes into account multiple complex factors. As is known in the art, object-oriented programming is used to design computer software that is easy to create, cost effective to modify and reusable. The object-oriented forestry simulation system includes a library of object-oriented modules for simulating various aspects of forestry management. The object-oriented forestry simulation system also includes a windowed graphical user interface that is used to view multiple forestry management factors as the forestry simulation progresses.

The object-oriented forestry simulation method includes maintaining a database containing a description of multiple forest resources and multiple management actions for managing the forest resources. The forest resources include trees, stands and wildlife. The management actions include cruise, grade, harvest, clear cut and plant. However, more or fewer forest resources and management methods could also be used.

An object-oriented forest resource model is constructed from the multiple forest resources in the database. An object-oriented management model is constructed from the multiple management actions in the database. The object-oriented management model is used for managing forest resources in the forest resource model. A simulation of forest resources over a pre-determined period of time is initiated using the object-oriented forest resource model. Periodically, the object-oriented management model is applied to the forest resources from the object-oriented forest resource model being used in the simulation to manage the forest resources.

An illustrative embodiment of the present invention uses object-oriented technologies to create a library of programmable components that is comprehensive, customizable and reflective of real world forest management. An illustrative embodiment of the present invention is capable of simulating many aspects of forest management simultaneously including: forestry operations, organization cash flow and environmental quality. An illustrative embodiment of the present invention allows forestry management to simultaneously consider multiple factors in designing a forest management plan and thereby provides solutions to forestry questions, such as multiple use management, that are difficult to answer.

The foregoing and other features and advantages of an illustrative embodiment of the present invention will be more readily apparent from the following detailed description, which proceeds with references to the accompanying drawings.

BRIEF DESCRIPTION OF THE DRAWINGS

FIG. 11 is a block diagram illustrating a screen display of an exemplary forestry simulation for an illustrative embodiment of the present invention.

DETAILED DESCRIPTION OF AN ILLUSTRATIVE EMBODIMENT

Forestry Simulation System

Figure 1:
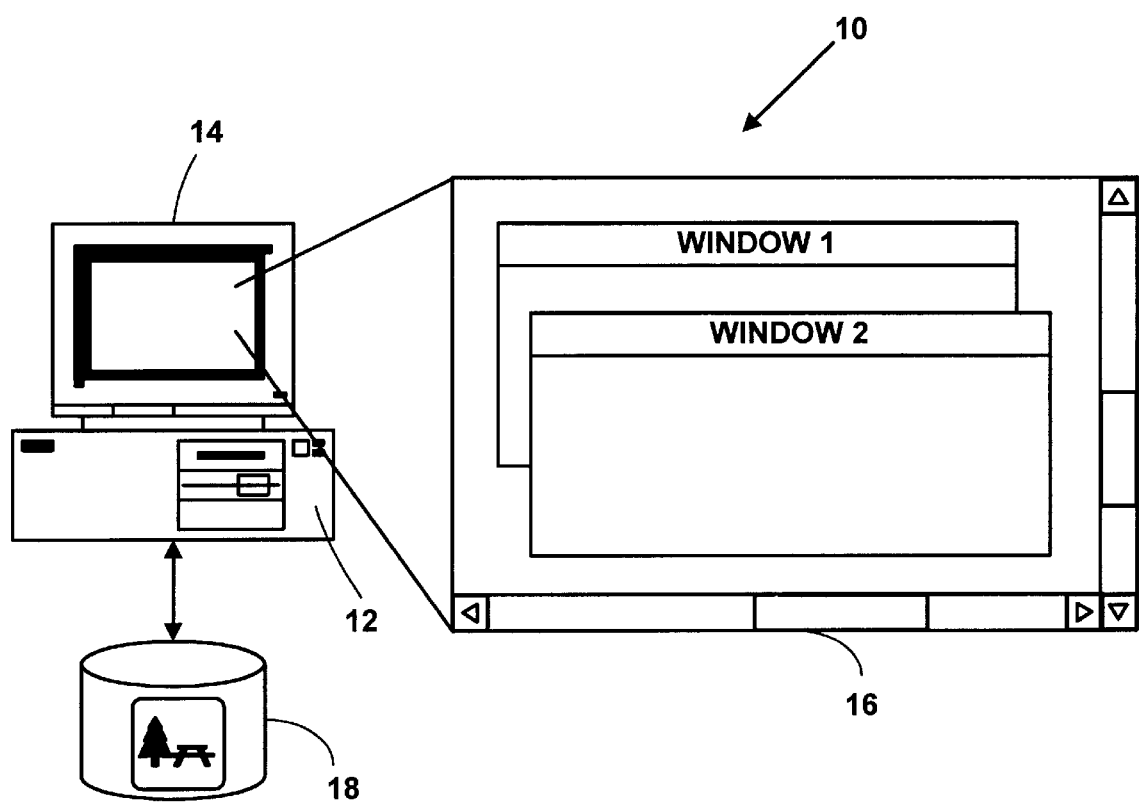
FIG. 1 illustrates a forestry simulation system.

FIG. 1 illustrates a forestry simulation system 10 for an illustrative embodiment of the present invention. Forestry simulation system 10 includes a computer 12 with a computer display 14. Display 14 presents a windowed graphical user interface ("GUI") 16 to a user. A database 18 contains a description of multiple forest resources and multiple management actions for the forest resources. Database 18 is stored in a memory system on computer 12 or in secondary storage such as a hard disk, floppy disk, optical disk, or other non-volatile mass storage devices.

An operating environment computer 12 of the present invention includes a processing system with at least one high speed Central Processing Unit ("CPU"). In accordance with the practices of persons skilled in the art of computer programming, the present invention is described below with reference to acts and symbolic representations of operations that are performed by the processing system, unless indicated otherwise. Such acts and operations are referred to as being computer-executed.

It will be appreciated that the acts and symbolically represented operations include the manipulation of electrical signals by the CPU. The electrical system represents data bits which cause a resulting transformation or reduction of the electrical signal representation, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, computer memory (e.g., RAM or ROM) and any other volatile or non-volatile mass storage system readable by the computer. The data bits on a computer readable medium are computer readable data. The computer readable medium includes cooperating or interconnected computer readable media, which exist exclusively on the processing system or be distributed among multiple interconnected processing systems that may be local or remote to the processing system.

Method of Forestry Simulation

Figure 2:
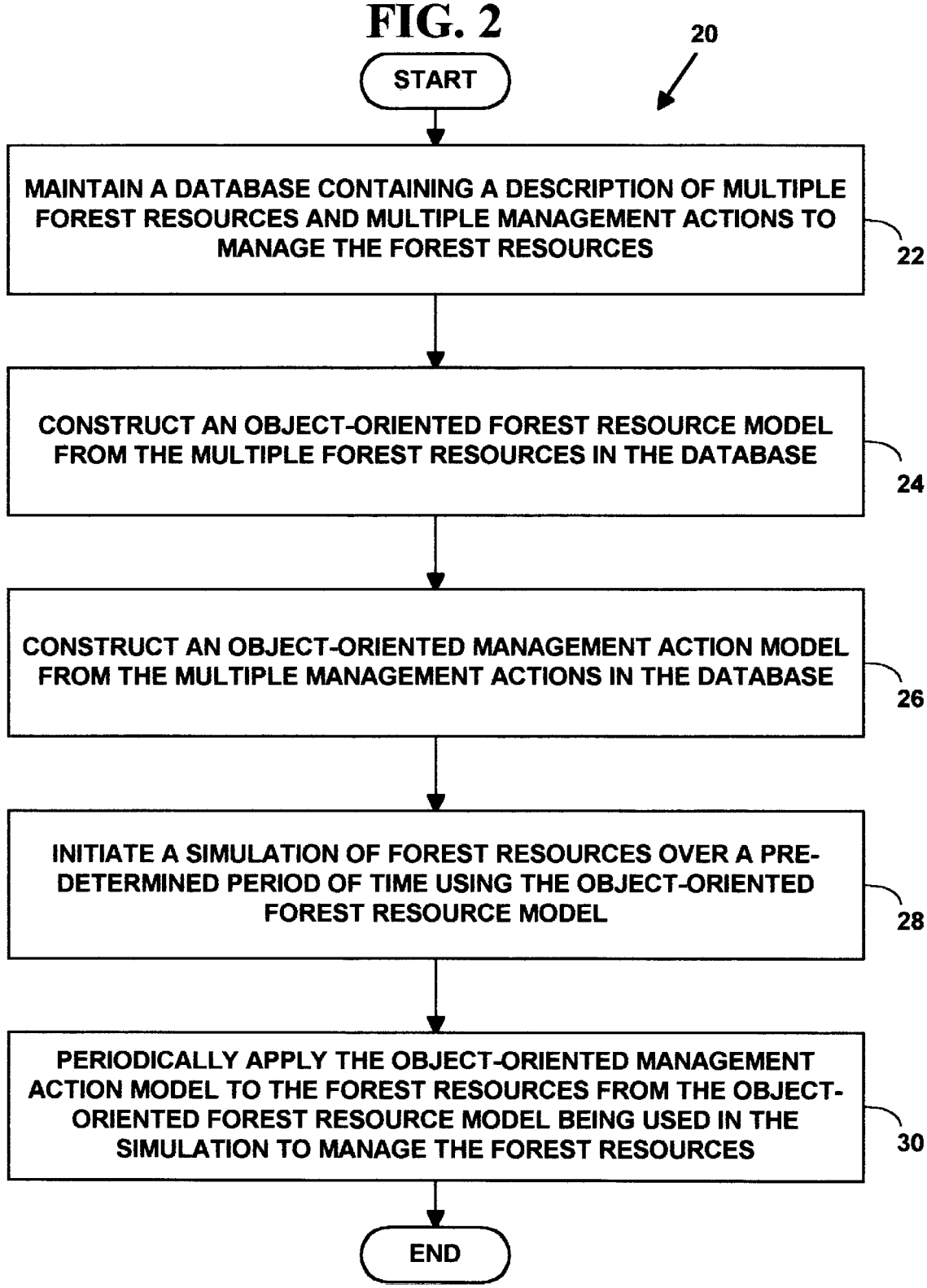
FIG. 2 is a flowing diagram illustrating a method for forestry simulation.

FIG. 2 is a flowing diagram illustrating a method 20 for forestry simulation. Method 20 includes maintaining a database (e.g., database 18) containing a description of multiple forest resources and multiple management actions for managing the multiple forest resources at step 22. The multiple forest resources include trees and stands. The management methods include accounting, cruise, grade, harvest, plant and scale. However, more or fewer forest resources and management methods could also be used. The forest resources and management actions are described below.

An object-oriented forest resource model is constructed from the multiple forest resources in the database at step 24. An object-oriented management model is constructed from the multiple management actions in the database at step 26. The object-oriented management model is used for managing forest resources in the forest resource model. A simulation of forest resources over a pre-determined period of time is initiated using the object-oriented forest resource model at step 28. At step 30, the object-oriented management model is periodically applied to the forest resources from the object-oriented forest resource model being used in the simulation to manage the forest resources.

Forest Resources and Management Actions

In an illustrative embodiment of the present invention, a description of multiple forest resources and multiple management actions included in database 18 are used with method 20 of FIG. 2 to create a forestry simulation. The description of multiple forest resources includes descriptions of trees, stands, tree growth parameters, stand growth parameters and wildlife (e.g., cavity nesting birds) and others as computer data stored in database 18. However, more or fewer forest resources could also be used. The computer data stored in database 18 includes tables and other data structures.

Trees are grouped into stands that represent larger geographic areas of similar forest types. Stands may be grouped into an ownership with specific ownership forest resource data. An ownership may be grouped into an organization with specific organization forest resource data. The tree and stand growth parameters include pre-defined growth curve data for Diameter at Breast Height ("DBH") and total height. A DBH is known to those skilled in the forestry arts.

The description of multiple management actions includes descriptions of accounting practices and forestry management practices including cruising, grading, harvesting, planting, scaling and others (e.g., salaries of employees carrying out the management actions) as computer data stored in database 18. However, more or fewer management actions could also be used. Cruising, grading, harvesting, planting and scaling techniques are known to those skilled in the forestry arts and explained below. The multiple forest resources and multiple management actions stored as computer readable data are used to construct the object-oriented forest resource and object-oriented management action models at steps 26 and 28 of method 20 (FIG. 2).

Object-oriented Simulation Environment

In an illustrative embodiment of the present invention, object-oriented programming techniques are used. As is known in the art, an "object type," also called an "object class," comprises a data-type, services that operate on instances of the data type, and a set of object attributes in an object-oriented data-structure. An "object attribute" is a field of data in an object that partially defines that object's state. An "object service" implements and manipulates objects, usually by reading or changing the object attributes. "Object-oriented design" is a software development technique in which a system or component is expressed using objects.

An object typically is an object-oriented data-structure that has multiple components including a function table, containing a pointer to each "object member " or member function (i.e., sometimes known as an "object method") defined in the object's class, an events table, for accepting events (e.g., OLE or ActiveX control events) and a data block, containing the current values for each object variable (i.e., data members, sometimes known as an "object property"). A computer software application has some reference to an object through an object pointer. A computer software application obtains this object reference by using some type of function call (direct or implied) in which that function allocates an object block in computer memory, initializes the function table, and returns a reference to allocated computer memory to an application. The computer memory may be local or distributed on a remote computer.

The Component Object Model (COM) and Distributed Component Object Model (DCOM) are models used for object-oriented programming and known to those skilled in the art. The COM and DCOM specify how objects within a single application or between applications (e.g., client/server applications) interact and communicate by defining a set of standard interfaces. Interfaces are groupings of schematically related functions through which a client application accesses the services of a server application.

Object Linking and Embedding (OLE), such as OLE Version 2 OLE controls and ActiveX Controls by the Microsoft Corporation of Redmond, Wash., are based in part on the Component Object Model and allow the creation of objects of different formats which operate on data through defined interfaces, rather than operating on the applications responsible for the data. ActiveX is based in part on OLE technologies. An OLE or ActiveX control is an object that accepts and responds to events, such as a selection by a mouse or a key on a keyboard, or a selection by another object-oriented member function. Detailed information on the OLE object interface can be found in *Inside OLE,* 2nd edition, by Kraig Brockschmidt, Microsoft Press, Redmond Wash., 1995 which is incorporated herein by reference.

Forest Control Object

An illustrative embodiment of the present invention includes an object-oriented library of forest resource objects and management method objects stored in database 18. The object-oriented objects are grouped according to object functionality.

Figure 3:
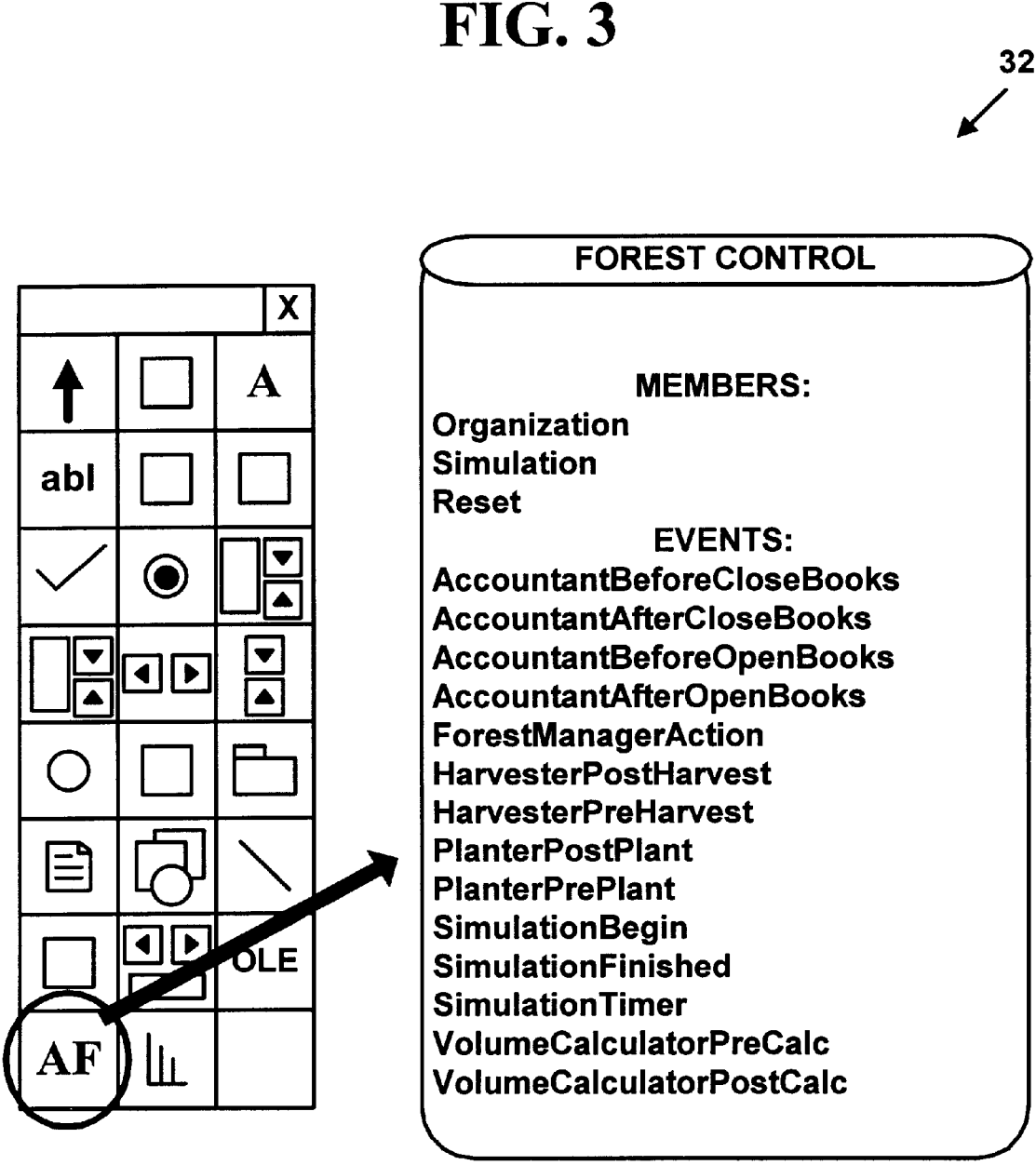
FIG. 3 is a block diagram illustrating a Forest Control object.

In an illustrative embodiment of the present invention, the object-oriented library is accessed through a single ActiveX control called a "Forest Control object." FIG. 3 is a block diagram illustrating a Forest Control object 32. However, more controls could also be used. Access to other objects in the library is made through Forest Control object 32. The Forest Control object is inserted into an ActiveX container and manipulated using an ActiveX compliant development environment. ActiveX containers are known to those skilled in the art. ActiveX compliant development environment includes languages such as Visual Basic and Visual C++ by Microsoft Corporation, and others. Once inserted, Forest Control object 32 object members give access to other objects in the object-oriented library.

Forest Control object 32 includes Organization, Simulation and Reset object members. However, more or fewer object members could also be used. The Organization object and Simulation objects are explained below. A number of ActiveX events are exposed by Forest Control object 32 so that a forestry simulation can be tracked and sampled as it is running. The ActiveX events include ForestMangerAction, HarvesterPreHarvest, HarvesterPostHarvest, PlanterPrePlant, PlanterPostPlant, AccountantOpenBooks, AccountantCloseBooks, SimulationTimer and SimulationFinished. However, more or fewer ActiveX events could also be used. For example a SimulationTimer event can be set to trigger once a year in a 100 year simulation allowing the simulated forest to be sampled for volume, timber cash flow, and habitat quality. As another example, a HarvesterPostHarvest event can be triggered after harvest events to sample a harvest volume.

Table 1 illustrates the components of the Forest Control object 32. However, more or fewer components could also be used.

TABLE 1

Forest Control object 32

Description
Forest Control object 32 is a top-level object through which other objects in the object library are accessed. Forest Control object 32 is an ActiveX/OLE control that is inserted on a form before access to other objects is possible. In addition to objects, Forest Control object 32 provides a number of events that can be trapped to facilitate tracking of forestry simulation progress.
Properties
  Organization As Organization
    The Organization object contains the Ownership, ForestManager and Accountant
    objects.
  Simulation As Simulation
    The Simulation object controls the starting and stopping of a simulation.
Methods
  Reset
    Reset is called to clear the current simulation from memory. It is typically called
    before creating a new simulation.
Events
The Forest Control object triggers a variety of events that can be caught in program code. The following is a list of available events. Although events are sent through the Forest Control object, they are initiated by other objects in the library and are described more fully in the text for those objects. The first word of each event designates the object that initiates the event (e.g., Accountant object for AccountantBeforeCloseBooks, etc.).
  AccountantBeforeCloseBooks
  AccountantAfterCloseBooks
  AccountantBeforeOpenBooks
  AccountantAfterOpenBooks
  ForestManagerAction(Action As Long, Stand As Stand)
  HarvesterPostHarvest(Stand As Stand)
  HarvesterPreHarvest(Stand As Stand)
  PlanterPostPlant(Stand As Stand)
  PlanterPrePlant(Stand As Stand)
  SimulationBegin
  SimulationFinished
  SimulationTimer
  VolumeCalculatorPreCalc
  VolumeCalculatorPostCalc

Simulation Control Object

In an illustrative embodiment of the present invention, a Simulation Control object creates a forestry simulation. The Table 2 illustrates properties, methods and events of the Simulation Control object. However, more or fewer properties, method and events could also be used.

TABLE 2

Simulation Control object

Description
The Simulation Control object implements starting, stopping and stepping through forestry simulations. A timer can be set that triggers an event each period. When Simulation Control object is finished, an event signaling the stop time has been reached is triggered.
Properties
   StopTimeAsLong
      The time at which the simulation will stop.
   TimeAsLong
      Holds the current time of the simulation.
   Timer As Long
      Sets the interval between SimulationTimer events. Set to zero if no timer events are desired.
Methods
   Start( ) As Boolean
      Call to start the simulation.
   Step() As Boolean
      Call to simulate the next period of the simulation.
   Stop() As Boolean
      Call to stop the simulation.
Events
   SimulationBegin
      Triggered just before system begins simulating.
   SimulationFinished
      Triggered when the system has reached the stop time.
   SimulationTimer
      Triggered at each passing of the Timer interval. If Timer = zero then no SimulationTimer events are triggered.
Remarks
   • Set the run time by setting the StopTime parameter.
   • Call Start( ) to begin a simulation, Step( ) to step through a single period or Stop( ) to stop the simulation.
   • Access the current time using the Time member.
   • The Simulation Control object is accessed through the Forest Control object.

Simulation Control object creates a forestry simulation by looping through multiple forest resources objects such as trees and carrying out a list of management actions performed on the multiple forest resources objects over a pre-determined simulated time period (e.g., 100 years)

Statistics from the simulation such as the number, biomass, age of organisms (e.g., trees) and simulation time are obtained by sampling the simulation as it runs over the pre-determined simulated time period. However, sampling occurs while the simulation is temporarily stopped. There are two methods of sampling a simulation: using timer events and manually.

Timer events are triggered by the simulation when the simulation timer is set to a value >0. When a timer event is triggered, the simulation is stopped internally. Sampling can then occur using a scripting program. When the timer event procedure ends, the simulation is restarted internally. There is no need to manually stop and start the simulation using timer events.

Manually triggering a sampling entails using a scripting program to temporarily stop the simulation, sample and restart the simulation. Manually triggering a sampling is useful when sampling is needed at times that can't be expressed as intervals.

To get a picture of how one or more factors (e.g., tree growth) is changing during a forestry simulation, sampling is done with a Cruiser object or a Biologist object. The Cruiser object and Biologist objects are explained below.

Figure 4:
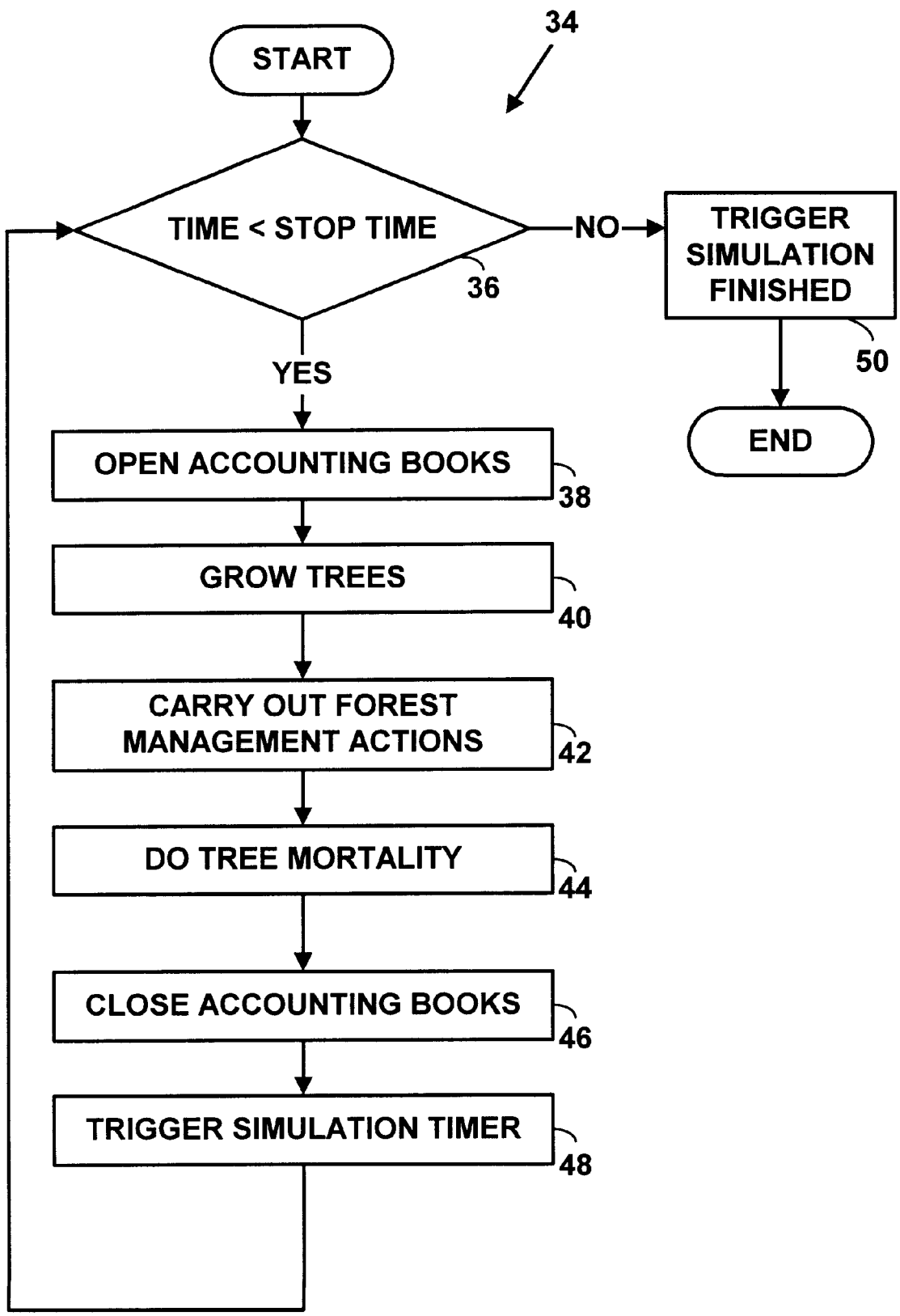
FIG. 4 is a flow diagram illustrating a method for a Simulation Control object.

FIG. 4 is a flow diagram illustrating a method 34 for the Simulation Control object to create an exemplary forestry simulation. At step 36, a test is conducted to determine whether a pre-determined time is less than a stop time. If so, at step 38 an open accounting books object member (e.g., from Accountant object) is called to track cash flow during a forestry simulation. When the accounting books are opened, income and expenses are set to zero. At step 40, a grow trees object member (i.e., from Stand object) is called to simulate the growing of trees in a stand. At step 42, one or more management actions are carried out (e.g., from ForestManager object including Biologist, Cruiser, Grader, Harvester, Planter, or Scaler objects). At step 44, an optional tree mortality object member (i.e., from Stand object) is called to simulate the mortality of trees in a stand (e.g., due to disease, insects, fires, etc.). At step 46, the accounting books are closed by calling a close accounting books object member (e.g., from Accountant object). At step 48, a simulation timer is triggered to complete the simulation with the Simulation Control object. At step 50, the Simulation Control object terminates.

However, more or fewer steps could also be used for the Simulation Control object. The steps in method 34 can also be executed in a different order than illustrated in FIG. 4 (e.g., simulation of tree mortality at step 44 can be completed on a stand of trees before management actions at step 42 are completed).

Forest Ecosystem Objects

In an illustrative embodiment of the present invention, a selected forest type is simulated corresponding to one or more ecological components in the selected forest type. The ecological components include one or more types of trees (e.g., spruce, fir, pine, etc.) Trees are described by TreeClass objects that give a number of trees by species and DBH classes. Tree growth is simulated using a pre-defined growth curve for DBH and total height. Trees are one of the multiple forest resource objects stored in database 18.

Forest Resource Objects

Figure 5:
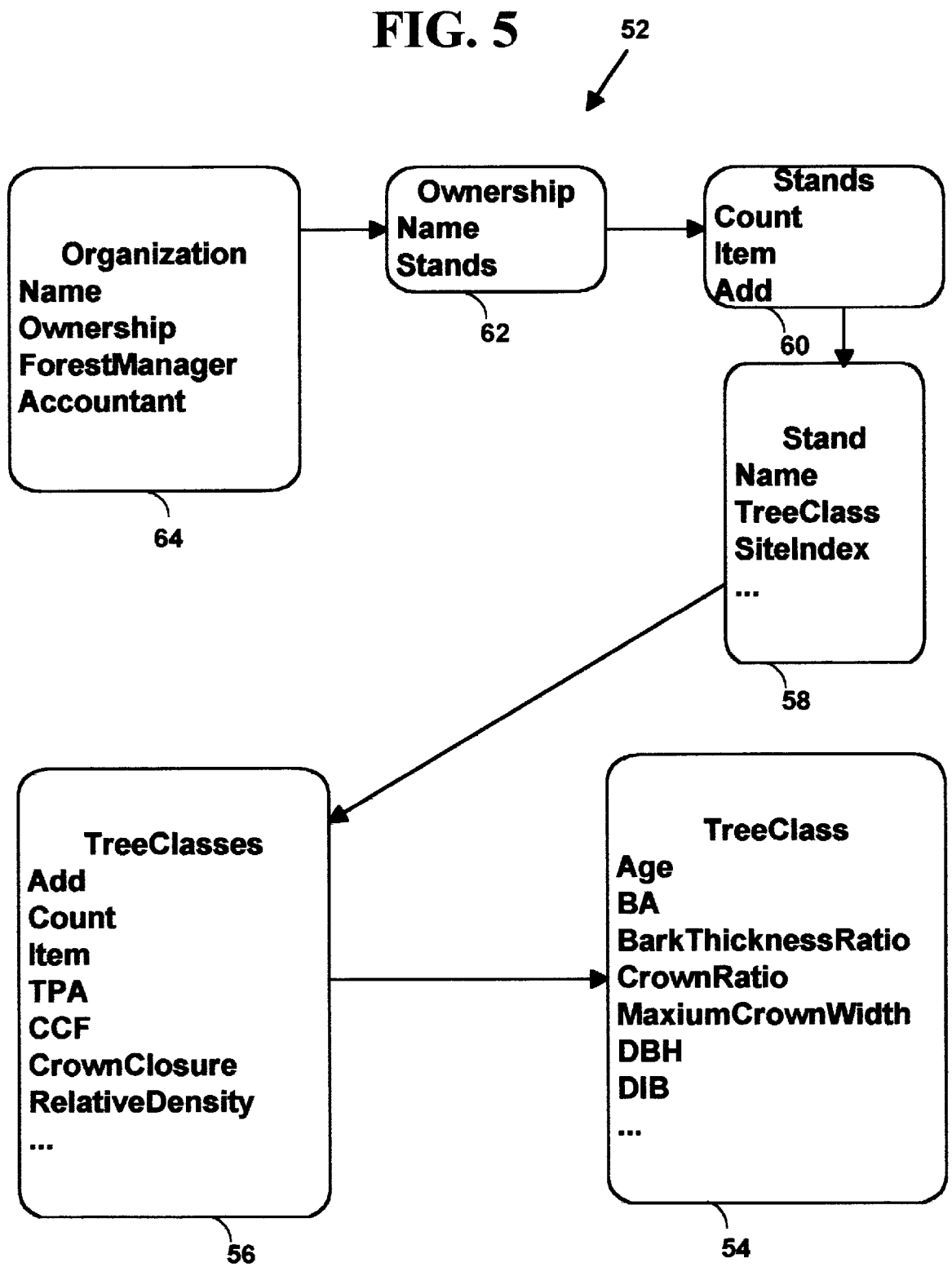
FIG. 5 is a block diagram illustrating Forest Resource objects.

FIG. 5 is a block diagram illustrating Forest Resource objects 52. FIGS. 5–10 illustrate various objects of an illustrative embodiment of the present invention. However FIGS. 5–10 may not illustrate all object properties, methods, events or members that are illustrated in the corresponding table for the object. All object properties are not illustrated in FIG. 5–10 for the sake of simplicity.

Forest Resources objects 52 use the description of multiple forest resources in database 18 described to create an object-oriented forest resource model at step 24 of method 20 (FIG. 2). In an illustrative embodiment of the present invention, Forest Resource objects 52 include one or more TreeClass objects 54 within a TreeClasses object 56 within a Stand object 58 within a Stands object 60 within an Ownership object 62 within an Organization object 64.

TreeClass objects are represented as more specialized objects (e.g., ConeTreeClass or TaperTreeClass described below). TreeClass objects define a base set of properties, methods and events that more specialized objects implement. Trees are measured at Diameter at Breast Height ("DBH") and using Tree-Per-Acre ("TPA"). Table 3 illustrates properties, methods and events of TreeClass object 54. However, more or fewer properties, method and events could also be used.

TABLE 3

TreeClass object 54

Description
TreeClass object 54 is a generalized class of tree that defines a base set of properties, methods
and events that other more specialized classes of trees implement when deriving from TreeClass
object 54. For example, the ConeTreeClass and TaperTreeClass derive from TreeClass object
54 and therefore implement TreeClass object's 54 members. The ConeTreeClass object and the
TaperTreeClass object are types of TreeClass object 54.
Properties
  Age As Long
    Age of the trees.
  BA As Long
    Basal area per acre.
  BarkThicknessRatio as Single
    Bark thickness ratio or diameter inside bark / diameter outside bark.
  CrownRatio As Long
    Length of crown as a percent of total height (e.g., Ritchie, 1987). Calculated as:
    BoleRatio = 1 − 1 / (1 + exp(b0 + b1*H + b2*CCFL + b3*In(BA) + b4*DBH/H + b5*SI))
    Where:
      H - Total height.
      CCFL - CCF for trees with DBH larger than this tree's DBH.
      BA - BA of stand.
      SI - Stand site index.
  MaximumCrownWidth As Long
    Width of crown if tree is open grown. Calculated as:
      MaximumCrownWidth = MCWO + MCWI * DBH − MCW2 * DBH2
  DBH As Single
    Diameter at breast height outside bark. The bottom of a tree is assumed to be at
    breast height.
  DIB(Single Height) As Single
    Returns the diameter inside bark at a given height.
  DOB(Single Height) As Single
    Returns the diameter outside bark at a given height.
  Defect As Single
    Amount of volume that is not merchantable. Expressed as a percent of gross volume.
  HeightcrownBase As Single
    Height of tree from base to base of crown.
  HeightDBH As Single
    Height of tree from base to DBH point.
  HeightTotal As Single
    Height of tree from base to tip.
  IsMaXAgeTest as Long
    Toggles mortality based on a maximum tree age. When IsMaxAgeTest = True,
    ConeTreeClass object will die when its age reaches MaXAge.
  MaxAge As Long
    Maximum age ConeTreeClass is allowed to obtain. Only applies when IsMaXAgeTest
    is set to true.
  Species As Long
    A numeric ID representing species.
  SetMCWparameters(Single MCWO, Single MCW1, Single MCW2)
    Sets the values of the maximum crown width parameters.
  Taperclass As Single
    Taper class used to define shape of tree.
  TPA As Single
    Trees per area. Valid if the ConeTreeClass is standing. If the ConeTreeClass has
    been harvested, the TreeCount member is valid.
  TreeCount As Single

TABLE 3-continued

TreeClass object 54

The number of individual trees this ConeTreeClass object represents. Valid if the
ConeTreeClass has been harvested. If the ConeTreeClass is standing, the TPA
member is valid.
Methods
Events
Remarks Table 4 illustrates properties, methods and events of TreeClasses object 56. However, more or fewer properties, method and events could also be used.

TABLE 4

TreeClasses object 56

Description
TreeClasses object 56 contains a List of TreeClass 54 objects. TreeClass objects 54 are
accessed using an index.
Properties
  Count As Long
    Returns the number of TreeClass objects 54 in the List. Read only.
Methods
  Add( ) As Object
    Creates a new TreeClass object 54 and adds it to the List. Returns the TreeClass
    object 54 created.
  Age as Long
    Average age of tree class objects in the List.
  BA(DBH As Single) As Single
    Sum of Basal Area ("BA") for tree class objects with DBH larger than that given in the
    list.
  CCF(DBH As Single) As Single
    Crown Competition Factor ("CCF") for trees with DBH larger than that given (e.g.,
    Krajicek et. al., 1961). Calculated as:
        $CCF = \Sigma(CW_i^2 * TPA_i) * \pi/4/43560$
    Where i denotes the $i^{th}$ tree class object in the list with DBH larger than MinDBH and $\pi$
    ("pi") = 3.1415927 . . .
  CrownRatio( ) As Single
    Average crown ratio weighted by TPA (or TreeCount if TreeClasses have been
    harvested).
  CrownClosure(DBH) As Single
    Crown Competition Factor for trees with HeightTotal > Height. Calculated similarly as
    CCF.
  Crownwidth( ) As Single
    Crown width of trees in the list.
  DBH As Single
    Returns the arithmetic average DBH of tree class objects in the list
  HeightTotal As Single
    Average total height of tree class objects in the list.
  Item(Index As Long) As Object
    Returns the TreeClass object 54 at the Index position in the list.
  QMD As Single
    Quadratic mean diameter or the DBH of a tree with average BA. Calculated as:
    When TreeClasses object represents standing trees:
        $QMD = BA/TPA * 4 * 144/\pi$
    When TreeClasses object represents cut trees:
        $QMD = BA/TreeCount * 4 * 144/\pi$
  RelativeDensity As Single
    Relative density(e.g., Curtis, 1982). Calculated as:
        $RelativeDensity = BA/QMD^{1/2}$.
  RemoveAll()
    Removes tree class objects from the list.
  Sort(Type as Long)
    Sorts the tree class objects in the list. Type interpreted as a bit filed where bit i sorts
    by species and bit 2 sorts by DBH. Sorting order parallels bit order.
  TPA(MinDBH As Single, MaxDBH As Single) As Single
    Returns the TPA for classes of trees with minimum DBH MinDBH and maximum DBH
    less than MaxDBH.
Events TreeClass objects 54 includes ConeTreeClass objects or TaperTreeClass object members. However, more or fewer TreeClass object 54 types could also be used. Cones and tapers are the two most common methods used to simulate the shape of trees in a stand. Table 5 illustrates properties, methods and events of ConeTreeClass object. However, more or fewer properties, methods and events could also be used.

TABLE 5

ConeTreeClass object

Description
The ConeTreeClass object represents a number of individual trees of the same species and DBH classes whose shape is described by a cone with base diameter equal to DBH and height equal to
total height. The number of trees the ConeTreeClass represents is given either in the TPA member if the tree class is standing or the TreeCount member if the tree class has been harvested.
Properties
   Age As Long
     Age of the trees.
   BA As Long
     Basal area per acre.
   BarkThicknessRatio as Single
     Bark thickness ratio or diameter inside bark I diameter outside bark.
   CrownRatio As Long
     Length of crown as a percent of total height (e.g., Ritchie, 1987). Calculated as:
     BoleRatio = $1 - 1/(1 + \exp(b0 + b1*H + b2*CCFL + b3*\ln(BA) + b4*DBH/H + b5*SI))$
     Where:
       H - Total height.
       CCFL - CCF for trees with DBH larger than this tree's DBH.
       BA - BA of stand.
       SI - Stand site index.
   MaximumCrownWidth As Long
     Width of crown if tree is open grown. Calculated as:
       MaximumCrownWidth = MCWO + MCWI * DBH - MCW2 * DBH2
   DBH As Single
     Diameter at breast height outside bark. The bottom of a tree is assumed to be at breast height.
   DIB(Single Height) As Single
     Returns the diameter inside bark at a given height.
   DOB(Single Height) As Single
     Returns the diameter outside bark at a given height.
   Defect As Single
     Amount of volume that is not merchantable. Expressed asa percent of gross volume.
   HeightCrownBase As Single
     Height of tree from base to base of crown.
   HeightDBH As Single
     Height of tree from base to DBH point.
   HeightTotal As Single
     Height of tree from base to tip.
   IsMaxAgeTest as Long
     Toggles mortality based on a maximum tree age. When IsMaxAgeTest = True, ConeTreeClass object will die when its age reaches MaxAge.
   MaxAge As Long
     Maximum age ConeTreeClass is allowed to obtain. Only applies when IsMaxAgeTest is set to true.
   Species As Long
     A numeric ID representing species.
   SetMCWparameters(Single MCWO, Single MCW1, Single MCW2)
     Sets the values of the maximum crown width parameters.
   TaperClass As Single
     Taper class used to define shape of tree.
   TPA As Single
     Trees per area. Valid if the ConeTreeClass is standing. If the ConeTreeClass has been harvested, the TreeCount member is valid.
   TreeCount As Single
     The number of individual trees this ConeTreeClass object represents. Valid if the ConeTreeClass has been harvested. If the ConeTreeClass is standing, the TPA member is valid.
Methods
Events
Remarks
   • Trees are represented as TreeClass objects. TreeClass objects, whether they are ConeTreeClass objects or TaperTreeClass objects, describe the number of trees of a single species and DBH class. TreeClass objects that represent standing trees are counted by the Trees-Per-Acre ("TPA") member and have their tree count (TreeCount) member equal to zero. TreeClass objects that have been harvested, have their TPA values converted to actual tree counts (TreeCount) using the stand acres.

Table 6 illustrates properties, methods and events of TaperTreeClass object. However, more or fewer properties, methods and events could also be used.

TABLE 6

TaperTreeClass object

Description
The TaperTreeClass object represents a number of individual trees of the same species and DBH classes whose shape is described by a table of taper values.
Properties
   Age As Long
     Age of the trees.
   BA As Long
     Basal area per acre.
   BarkThicknessRatio as Single
     Bark thickness ratio or diameter inside bark/diameter outside bark.
   CrownRatio As Long
     Length of crown as a percent of total height (Ritchie, 1987). Calculated as:
     BoleRatio = $1 - 1/(1 + \exp(b0 + b1*H + b2*CCFL + b3*\ln(BA) + b4*DBHIH + b5*SI))$
     Where:
       H - Total height.
       CCFL - CCF for trees with DBH larger than this tree's DBH.
       BA - BA of stand.
       SI - Stand site index.
   MaximumCrownWidth As Long
     Width of crown if tree is open grown. Calculated as:
       MaximumCrownWidth = $MCWO + MCW1 * DBH - MCW2 * DBH2$
   DBH As Single
     Diameter at breast height. The bottom of a tree is assumed to beat breast height.
   DIB(Single Height) As Single
     Returns the diameter inside bark at a given height.
   DOB(Single Height) As Single
     Returns the diameter outside bark at a given height.
   Defect As Single
     Amount of volume that is not merchantable. Expressed as a percent of gross volume.
   HeightCrownBase As Single
     Height of tree from base to base of crown.
   HeightDBH As Single
     Height of tree from base to DBH point.
   HeightTotal As Single
     Height of tree from base to tip.
   IsMaxAgeTest as Long
     Toggles mortality based on a maximum tree age. When IsMaxAgeTest = True,
     ConeTreeClass object will die when its age reaches MaxAge.
   MaxAge As Long
     Maximum age TaperTreeClass is allowed to obtain. Only applies when
     IsMaxAgeTest is set to true.
   Species As Long
     A numeric ID representing species.
   TaperClass As Single
     Taper class used to define shape of tree.
   TPA As Single
     Trees per area. Valid if the TaperTreeClass is standing. If the TaperTreeClass has
     been harvested, the TreeCount member is valid.
   TreeCount As Single
     The number of individual trees this TaperTreeClass object represents. Valid if the
     TaperTreeClass has been harvested. If the TaperTreeClass is standing, the TPA
     member is valid.
Methods
Events
Remarks
   • The TreeCount member describes the amount of individual trees represented by this
     tree class. It is only valid for TreeClass members of the Harvester.
   • The TPA member describes the amount of individual trees per acre represented by
     this tree class. It is only valid for the TreeClasses member of the Stand object.

TreeClass objects 54 describe the TPA of a unique species and a DBH class. There can be as many TreeClass objects 54 as needed in a Stand object 58 and additional objects for simulating tree growth other than TaperTreeClass and ConeTreeClass objects.

Stand objects are represented as more specialized objects that derive from the Stand object. Stand objects define a base set of properties, methods and events that more specialized objects implement.

Table 7 illustrates properties, methods and events of Stand object 58. However, more or fewer properties, methods and events could also be used.

TABLE 7

Stand object 58

Description
Stand object 58 contains a list of trees.
Properties
  Area As Single
    The area of the stand.
  Name As String
    User supplied name.
  TreeClasses As TreeClasses
    A TreeClasses object that contains the tree classes present in the stand.
  TreeType As Long
    Sets the type of tree classes being held in this Stand object 58;
  IsMaximumAgeTest As Long
    Determines whether the maximum age test will be carried out on tree classes.
  IsMortality As Long
    Determines whether mortality will be carried out.
  IsRegeneration As Long
    Determines whether regeneration will be carried out.
  SiteIndex As Single
    50 year site index
  MaximumDensityCurve As Curve
    A maximum density curve used when mortality is being used.
  PlantingRule As Long
    ID for default planting rule or rules that will be carried out if no planting ru#e is
    specified with a planting action.
  ThinningRule As Long
    ID for default thinning rule or rules that will be carried out if no thinning rule is
    specified with a thinning action.
  SelectiveCuttingRule As Long
    ID for default selective cutting rule or rules that will be carried out if no selective
    cutting rule is specified with a selective cutting action.
  ClearCutRule As Long
    ID for default clear cut rule or rules that will be carried out if no clear cut rule is
    specified with a clear cut action.
  Parameters As Object
    The set of growth parameters.
Methods
  SetTaper(Points as String)
    The set of taper points applied to tree classes within this stand.
Events
Remarks
  • Trees are stored in the Stand object 58 as TreeClass objects 54 that specify the trees
    per acre for the different tree classes present. Species and DBH describe unique tree
    classes.

Table 8 illustrates properties, methods and events of Stands object 60. However, more or fewer properties, methods and events could also be used.

TABLE 8

Stands object 60

Description
Stands object 60 contains a List of stands; Stand objects 58 are accessed using an index.
Properties
  Add()AsStand
    Creates a new Stand object 58 and adds it to the List. Returns the Stand object 58
    created.
  Area As Single
    The area of the stand.
  Count As Long
    Returns the number of Stand objects 58 in the List. Read only.
Methods
  Item(Index As Long) As Stand
    Returns the Stand object 58 at the Index position in the List.
  Item(Name As String) As Stand
    Returns the Stand object 58 with a given name.
Events
Remarks Table 9 illustrates properties, methods and events of Ownership object 62. However, more or fewer properties, methods and events could also be used.

TABLE 9

Ownership object 62

Description
Ownership object 62 contains a List of stands from Stands object 60. An ownership is the highest
level of forest resource containment.
Properties
   Age As Long
      The average age of TreeClass objects 54 in stands. Read only.
   BA As Single
      The total basal area of TreeClass objects 54 in stands. Read only.
   DBH As Single
      The average DBH of TreeClass objects 54 in stands. Read only.
   Name As String
      User supplied name.
   Stands As Stands
      A List of stands in the ownership.
   TotalHeight As Single
      The average total height of TreeClass objects 54 in stands. Read only.
   CFF As Single
      The average crown competition factor of TreeClass objects 54 in stands. Read only.
Methods
   TPA(MinDBH As Single, MaxDBH As Single) As Single
      The average TPA for TreeClass objects 54 in stands with minimum DBH MinDBH and
      maximum DBH less than MaxDBH.
Events
Remarks
   • Access the Stand objects 58 through the Stands member.

Table 10 illustrates properties, methods and events of Organization object 64. However, more or fewer properties, methods and events could also be used.

TABLE 10

Organization object 64

Description
Organization object 64 corresponds to an organization that manages forested lands. The
organization holds other objects related to ownership and management.
Properties
   Accountant As Accountant
      Tracks income and expenses as a simulation runs.
   ForestManager As ForestManager
      Coordinates the harvesting and planting of trees in stands. The Harvester, Planter,
      Cruiser, Scaier and Grader objects are assessed through the ForestManager.
   Name As String
      User supplied name.
   Ownership As Ownership
      Represents the extent of land ownership or Land management by the organization.
      Ownership contains a List of stands that together make up the Land that is owned or
      managed by the organization.
Methods
Events
Remarks
   • Access Ownership object 62, ForestManager object and Accountant object through
      Organization object 64.
   • The Organization object 64 contains an Ownership object 62, which in turn contains a
      List of Stand objects 60. Organization object 64 also includes a ForestManger and an
      Accountant object member. The ForestManager coordinates harvesting and planting
      activities on the ownership. The Accountant tracks the flow of income and expenses.

Forest Management Objects

Figure 6:
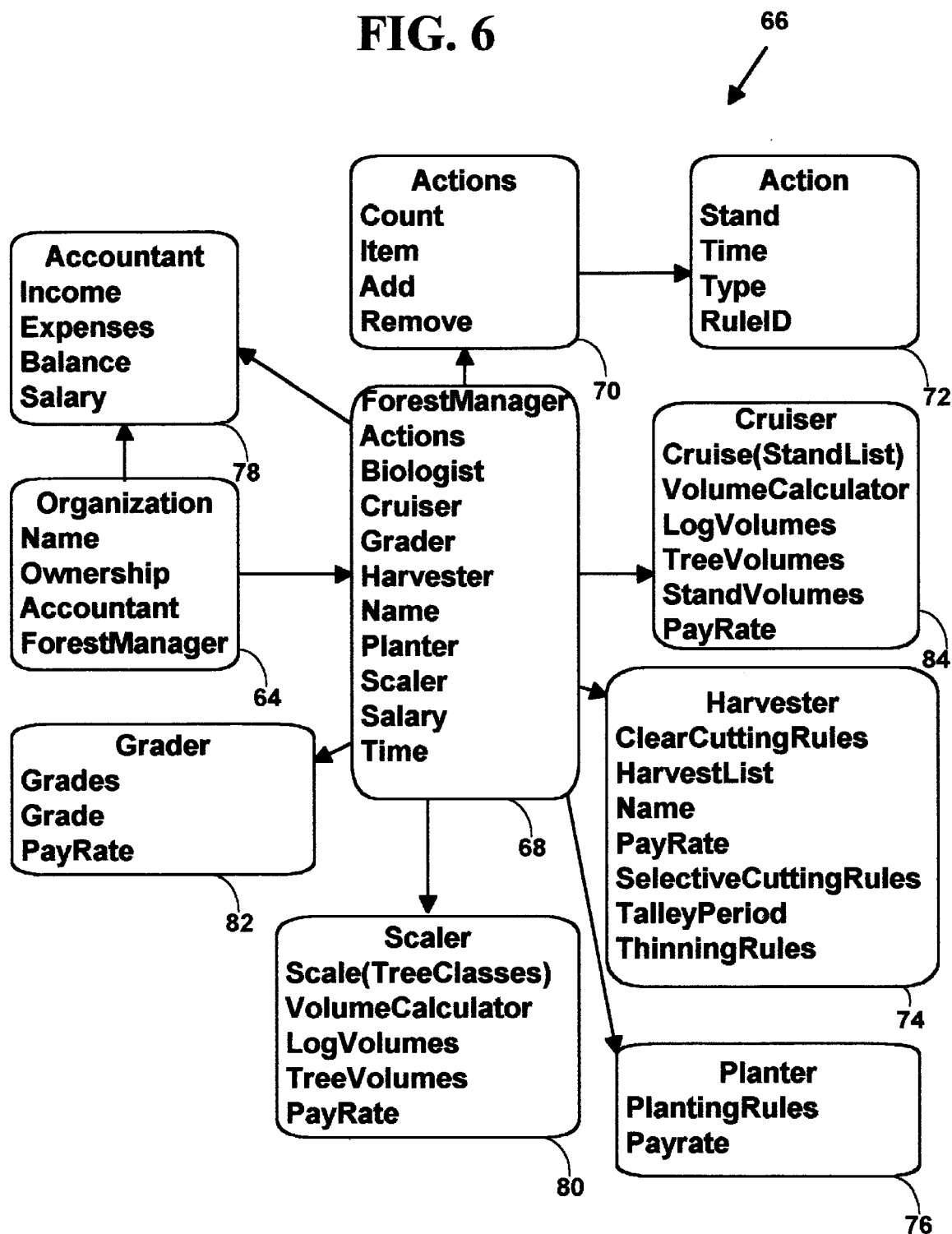
FIG. 6 is a block diagram illustrating Forest Management objects.

Coordinating the management of forestry operations is done using the Forest Management objects. FIG. 6 is a block diagram illustrating Forest Management objects 66. Forest Management objects 66 uses the description of multiple management actions in database 18 to create an object-oriented management model at step 26 of method 20 (FIG. 2). Forest Management objects coordinate management activities among a set of management objects. Forest Management objects 66 apply management actions to forest resources.

A ForestManager object is an employee of Organization object 64 that coordinates forest management among a number of other management objects including a Biologist, Cruiser, Grader, Harvester, Planter and Scalar object-oriented objects. The ForestManager object uses a list of actions that describe management tasks to be carried out on stands via the other management objects. The actions specify a year, stand, and action to be carried out (e.g., plant, clear cut, selective cut, etc.). As a management object performs an action, it "bills" the organization via the Accountant for its services. An Accountant object subtracts expenses from a budget. The timber in a stand is "sold" according to its graded value with the sale going into the budget as income. Cash flow for Organization object 64 can be tracked during a simulation by sampling the Accountant object.

As is illustrated in FIG. 6, ForestManager object 68 uses an Actions object 70 and an Action object 72 with a list of management actions along with a list of management rules to carry out the management actions. Table 11 illustrates properties, methods and events of ForestManager object 68. However, more or fewer properties, methods and events could also be used.

TABLE 11

ForestManager 68

Description

ForestManager object 68 coordinates forest management
activities among the management objects. Each management
period ForestManager 68 loops through a list of
management actions and instructs the other Forest
Management objects 66 to carry out management actions
if any are scheduled.
Properties Actions As Actions
        Holds a list of actions to be carried out
        during a simulation.
    Biologist As Biologist
        The Biologist object calculates habitat quality indices.
    Cruiser As Cruiser
        The Cruiser object calculates the timber
        volume present in stands.
    Grader As Grader
        The Grader object grades and values volumes.
    Harvester As Harvester
        The Harvester object harvests stands when the average
        age of trees in a stand exceeds the rotation
        age by deleting trees in the stand.
    IsAutoThin As Long
        Determines whether the auto thin method is turned on.
    Name As String
        User supplied name of object.
    Planter As Planter
        The Planter object plants trees in stands.
    Scaler As Scaler
        The Scaler calculates volumes in trees.
    Salary As Single
        The cost of ForestManager's
        services for one period. At the end
        of the period, the ForestManager's
        salary is billed to the organization.
    Time As Long
        Returns the current period for this ForestManager object.
Methods
Events ForestManagerAction(Action As Long, Stand As Stand)
        Triggered after the ForestManager object performs
        an action on a stand.
Remarks

* Set up actions for the simulation using the ForestManager's
    object 68 Actions object.
    * Other member's of Forest Management objects
    66 may carry out tasks independent of the
    scheduled actions at any time during a TABLE 11-continued ForestManager 68 simulation. For example, Cruiser object
    84 can be told calculate standing volume
    once a period from the scripting language
    independently of ForestManager object 68.

Table 12 illustrates properties methods and events of Actions object 70. However, more or fewer properties, methods and events could also be used.

TABLE 12

Actions object 70

Description

Actions object 70 contains a list of Action objects 72.
Action objects 72 are accessed using an index.
Properties Count As Long
        Returns the number of Action objects 72 in the list. Read only.
Methods Item(long Index) As Action
        Returns the Action object 72 at the Index position in the list.
    Add( ) As Action
        Creates a new Action object 72 and adds it to the list.
        Returns the Action object 70 created.
    RemoveAll(long Index)
        Removes all Action object 72 from the list.
Events
Remarks Table 13 illustrates properties methods and events of Action object 72. However, more or fewer properties, methods and events could also be used.

TABLE 13

Action object 72

Description

Action object 72 specifies a forest management action
to be performed, a stand to perform it on, a period
at which it is performed and a rule that defines how
it will be carried out. Action objects 72 are stored
within the Actions object 70.
Properties Stand As Object
        Stand object 58 that the action is to be performed on.
    Time As Long
        The time at which the action is to be performed.
    Type As Long
        A number specifying the type of action to be performed.
        0 - Plant.
        1 - Thin.
        2 - Selective cut.
        3 - Clear cut.
    RuleID as Long
        A numeric Id identifying the rule to be used to carry out
        the action. This number equates to a rule object in the
        consultant who will carry out the action.
    RuleName as String
        A text description of the rule name
Methods
Events
Remarks

* The rule used to carry out an action is defined in the
    appropriate consultant. For example, if a clear cut action
    contained a rule ID of 3, the ClearCutRule object with TABLE 13-continued Action object 72

ID of 3 stored in the ClearcutRules object of the
Harvester object is used.

Management plans are simulated by having ForestManager object 68 instruct a Harvester object 74 and a Planter object 76 to carry out management actions. Management actions specify the period, stand and action to be carried out and its associated rule.

Harvester object 74 carries out clear cuts, selective cuts or thinnings. If clear cut is used, all trees are removed from the stand. If selective cut is used, a graph of trees per acre to leave versus DBH class is used to determine the trees to cut. Thinnings can be based on DBH or crown ratio using from below, from above or even selection methods. After a harvest has occurred, the HarvestList member of the Harvester object 74 contains a list of harvested trees by stand.

Table 14 illustrates properties, methods and events of Harvester object 74. However, more or fewer properties, methods and events could also be used.

TABLE 14

Harvester object 74

Description

Harvester object 74 harvests timber in stands using either
thinning, a clear cut or a selective cut method. If a
selective cut is used, trees are removed until
densities match a predefined size class distribution.
The harvested trees can be accessed and scaled for
volume by the Scaler object.
    Clear Cut
        If clear cut is selected, Harvester object
        74 removes all trees in the stand being harvested.
    Selective Cut
        When selective cutting, Harvester
        object 74 removes trees until the stand
        TPA ≦ the TPA specified.
Properties ClearCuttingRules As ClearCuttingRules
        A ClearCuttingRules object that holds a
        set of ClearCuttingRule objects that defines
        how clear cutting is carried out.
    Name As String
        User supplied name of object.
    PayRate As Single
        Rate of pay for each stand harvested.
        Billed to organization after each harvest.
    SelectiveCutting Rules As SelectivecuttingRules
        A SelectiveCuttingRules object that holds a
        set of SelectiveCuttingRule objects that
        define how selective cutting is carried out.
    TallyPeriod As Long
        Length of time Harvester will accumulate
        harvested trees into TreeClasses member
        before resetting TreeClasses to 0.
    ThinningRules As ThinningRules
        A ThinningRules object that holds a set
        of ThinningRule objects that defines how
        thinning is carried out. See ThinningRules.
    HarvestList As HarvestList
        A HarvestList object that holds the list
        of stands that were harvested in the current
        period.
Methods SetTPA(Points As String)
        A set of points with the format
        "DBH1, TPA1; DBH2, TPA2;. . . " that
        specifies the trees per acre for DBH classes.

TABLE 14-continued

Harvester object 74

The harvester compares the trees per acre
        in the stand and removes those tree classes
        that have more than that specified here. For DBH
        classes not specified, the Harvester
        linearly interpolates.
Events HarvesterPreHarvest(Stand As Stand)
        Triggered before a stand is harvested.
        The stand to be harvested is passed as a
        parameter.
    HarvesterPostHarvest(Stand As Stand)
        Triggered after a stand has been
        harvested. The stand harvested is passed as a
        parameter.
Remarks

* Harvester object 74 is internally instructed
    by the ForestManager 68 to harvest according to
    the actions specified in the Actions member of the
    ForestManager 68.
    * The HarvesterPostHarvest event can be used to
    trigger Scaler object 80 to calculate the volume
    of the harvested trees.
    * If selective harvesting is to occur, the
    SetTPA( ) member is called.
    * After harvesting, the TreeClass objects 54
    that were harvested are listed in the TreeClasses
    object 56. Each TreeClass object 54 in TreeClasses
    object 56 have their Count member set to the number
    of individuals of that tree class that were
    harvested and the TPA member set to 0.

Planter object 76 plants trees according to a list of saplings. Saplings are TreeClass objects 54 that are inserted into Stand objects 58 at a time of simulated planting.

Table 15 illustrates properties, methods and events of Planter object 76. However, more or fewer properties, methods and events could also be used.

TABLE 15

Planter object 76

Description

Planter object 76 plants trees according to its
list of saplings.
Properties

Name As String
        User supplied name.
    PlantingRules As PlantingRules
        A PlantingRules object that holds a list of
        PlantingRule objects which define how planting
        is carried out
Methods
Events PlanterprePlant(Stand As Stand)
        Triggered before a stand is planted.
        The stand to be planted is passed as a
        parameter.
    PlanterPostPlant(Stand As Stand)
    Triggered after a stand is planted.
    The stand planted is passed as a parameter.
Remarks

* Planter object 76 is internally instructed
    by ForestManager object 68 to plant stands
    according to the actions set up for the simulation.
    * Set up the tree to the planted using the Saplings member.
    tree classes re planting when this rule is carried out.

Cash flow is tracked through the use of an Accountant object 78. Both the ForestManager object 68 and Accountant object 78 are "employees" of Organization object 64 (FIG. 5). Their costs are accounted for as a fixed salary each period.

Table 16 illustrates properties, methods and events of Accountant object 78. However, more or fewer properties, methods and events could also be used.

TABLE 15

Accountant object 78

Description

Accountant object 78 tracks cash flow during a
simulation. Organization wide income and
expenses are accessed through object members.
    Opening the Books
When the books are opened, income and Expense are set to 0.
    Closing the Books
When the books are closed, fixed costs and the
Accountant object's 78 salary are added to Expense.
NetPresentValue and the InternalRateOfReturn
are also calculated.
Properties Balance As Single
        Tracks the balance during an entire simulation.
    Expense As Single
        Tracks the expenses for they year.
        Transferred to the balance when the books are
        closed. Zero at the beginning of the year.
    FixedCostsperArea As Single
        Operation expense incurred on a per area
        basis. Transferred to the balance when the
        books are closed.
    FixedCostsPerPeriod As Single
        Operation experise incurred on a per simulation
        period basis. Transferred to the
        balance when the books are closed.
    FixedCostsPerStand As Single
        Operation expense incurred on a per Stand basis.
        Transferred to the balance when
        the books are closed.
    Income As Single
        Tracks the income for they year.
        Transferred to the balance when the books are
        closed. Zero at the beginning of the year.
    InitialExpense As Single
        Operation expense that is incurred

TABLE 15-continued

Accountant object 78 once at the beginning of a simulation.
    InternalRateOfReturn As Single
        The internal rate of return that is calculated
        as a result of the management of forest
        resources.
    MinimumAcceptableRate As Single
        The minimum acceptable rate of return used
        to calculate the internal rate of return.
    Name As Single
        Name of the accountant object.
    NetPresentValue As Single
        the net present value calculated as a
        result of the management of forest resources.
    Salary As Single
        The cost of Accountant's services for
        one year. At the end of the year, the
        Accountant's salary is billed to the organization.
    Time As Single
        Simulation time.
Methods
Events AccountantBeforeOpenBooks
        Triggered just before the books are opened.
    AccountanAfterOpenBooks
        Triggered just after the books are opened.
    AccountantBeforeCloseBooks
        Triggered just before the books are closed.
    AccountantAfterCloseBooks
        Triggered just after the books are closed.
Remarks \* Add any external expenses to the Expense member
before the books are closed so that they
will be included in NPV and IRR
cash flow calculations.

Harvested trees can be scaled using a Scaler object 80 then graded using a Grader object 82. The resulting value can be added to the organization's income using Accountant object 78.

Table 17 illustrates properties, methods and events of Scaler object 80. However, more or fewer properties, methods and events could also be used.

TABLE 17

Scaler object 80

Description
Scaler object 80 calculates the volumes in trees.
Properties
    IsTallyLogVolumes As Long
        The VolumeCalculator can tally volume into log classes.
        1 - Tally volumes into log classes. Log volumes are accessed through the
            LogVolumes object.
        0 - Don't tally volumes into log classes. The LogVolumes object will be empty.
    IsTallyTreeVolumes As Long
        The VolumeCalculator can tally volume into tree classes.
        1 - Tally volumes into tree classes. Tree volumes are accessed through the
            TreeVolumes object.
        0 - Don't tally volumes into tree classes. The TreeVolumes object will be empty.
    LogVolumes As LogVolumes
        Holds timber volume tallied by log classes. Species, diameter and length determine
        unique log classes. This object will be empty unless IsTallyLogVolumes is set to true.
    MinDBH As Single
        A minimum DBH used to determine which tree classes contribute volume to volume
        tallies.
    Name As String
        User supplied name.

TABLE 17-continued

Scaler object 80

PayRate As Single
   Rate of pay for each TreeClasses object scaled. Billed to organization.
TreeVolumes As TreeVolumes
   Holds timber volume tallied by tree classes. Species and DBH determine unique tree
   classes. This object will be empty unless IsTallyTreeVolumes is set to true.
VolumeCalculator As VolumeCalculator
   Calculates volume and tallies it into log and tree classes.
TallyMode as Long
   Determines whether volume tallies are averaged each call the Scale(). If
   TallyMode = 0, volume tallies are averaged each call the Scale(). If TallyMode = 1,
   averaging does not occur. The Average() method should be called manually to
   average the tallies.
Methods
  Scale(TreeClasses As TreeClasses)
    Instructs the Scaler to scale the TreeClasses given. The resulting volumes calculated
    from the scale is accessed through the VolumeCalculator object.
  Average()
    Instructs the Scaler to average the volume tallies
  Clear()
    Instructs the Scaler to clear the volume tallies.
Events
Remarks
  • Scale trees by calling the Scale() member, passing a TreeClasses object 54. Then
    access the resulting volume through the LogVolumes object or TreeVolumes objects
    in the Scaler's object 80 VolumeCalculator object.
  • The LogVolumes object can be given to Grader object 82 for grading and calculating
    the value of the volume.
  • The Scaler object 80 calculates the volume of individual trees. Therefore, the Count
    member of the TreeClass object 54 is used in calculations rather than the TPA
    member.
  • Access Scaler object 80 through ForestManager object 68

Table 18 illustrates properties, methods and events of Grader object 82. However, more or fewer properties, methods and events could also be used.

TABLE 18

Grader object 82

Description
Grader object 82 grades and values timber volume. Grader object 82 takes the Log volumes in a
LogVolumes object and sorts the volume into grade classes that are described in the Grader's
Grades object. The grading process fills in the value and volume fields of Grades object.
Properties
  Grades As Grades
    A Grades object that is used to both set up grades and to obtain the volume and
    value of timber after grading has occurred. Grades are entered into the Grades
    object in order of decreasing value.
  Name As String
    User supplied name of Grader.
  PayRate As Single
    Rate of pay for each LogVolumes object graded. Billed to organization after each
    grading.
Methods
  Grade(LogVolumes As LogVolumes)
    Grades the volume passed as a parameter and returns the resulting grades. The
    volume and value of each Grade object in the Grades object can be sampled after the
    function returns.
Events
Remarks
  • First create a set of grades using the Grades member of the Grader object. Call
    Grade() passing the LogVolumes object to be graded. The LogVolumes object can
    be created using either the Cruiser or Scaler objects.
    Each LogVolume object in the LogVolumes object is compared to each Grade
    object in the Grades object. Grades are compared from the first Grade object in the
    list to the last Grade object in the Grades object. The first Grade object that matches
    the LogVolume object is used as the grade for that volume. The total value for the
    grade is incremented using the Grade's rate value and the LogVolume's board foot
    value.
      If a LogVolume object does not match any Grade objects, it does not contribute
    to grade volume or value. The Grade object's Number ungraded tracks the number of
    LogVolume objects with no matching grades. When the Grade() function returns, the

TABLE 18-continued

Grader object 82

Grades object can be sampled for the result.
* The resulting graded volume is accessed through the Grades object.
* Grader's object 82 list of grades should be set up prior to grading. They should be entered into Grades object in order of decreasing value.

Cruiser object 84 calculates stand volume by "cruising" one or more stands. The tallies can be by stand, tree class or log. Cruiser object 84 is used to do volume calculations and can be configured for a number of board feet and cubic feet measures.

Table 19 illustrates properties, methods and events of Cruiser object 84. However, more or fewer properties, methods and events could also be used.

TABLE 19

Cruiser object 84

Description
Cruiser object 84 calculates the volume of standing trees. Volumes for any number of stands can be calculated. Volume can be summarized by stand, tree class and Log class. The stands past to the Cruise() method and minimum DBH setting determines the trees whose volume is calculated. Volume is calculated using the VolumeCalculator object that contains settings for determining how volume is summarized. Once volume is calculated, it is returned through the StandVolumes, TreeVolumes and LogVolumes classes.
Properties
  IsTallyLogVolumes As Long
    The VolumeCalculator can tally volume into Log classes.
    1 -    Tally volumes into Log classes. Log volumes are accessed
    through the LogVolumes object.
    0 -    Don't tally volumes into Log classes. The LogVolumes object will
    be empty.
  IsTallyTreeVolumes As Long
    The VolumeCalculator can tally volume into tree classes.
    1 -    Tally volumes into tree classes. Tree volumes are accessed
    through the TreeVolumes object.
    0 -    Don't tally volumes into tree classes. The TreeVolumes object
    will be empty.
  IsTallyStandVolumes As Long
    The VolumeCalculator can tally volume by stand.
    1 -    Tally volumes by stand. Stand volumes are accessed through
    the StandVolumes object.
    0 -    Don't tally volumes by stand. The StandVolumes object will be
    empty.
  Name As String
    User supplied name of object.
  MinDBH As Single
    A minimum DBH used to determine which tree classes contribute volume to volume
    tallies.
  PayRate As Single
    Rate of pay for each stand cruised. Billed to organization.
  VolumeCalculator As VolumeCalculator
    Calculates volume and tallies it into Log and tree classes.
  LogVolumes As LogVolumes
    Holds timber volume tallied by Log classes. Species, diameter and Length determine
    unique Log classes. Set IsTallyLogVolumes to true and call the Cruise() method to fill
    the LogVolumes object.
  TreeVolumes As TreeVolumes
    Holds timber volume tallied by tree classes. Species and DBH determine unique tree
    classes. Set IsTallyTreeVolumes to true and call the Cruise() method to fill the
    TreeVolumes object.
  StandVolumes As StandVolumes
    Holds timber volume tallied by stand. Set IsTallyStandVolumes to true and call the
    Cruise() method to fill the StandVolumes object.
Methods
  Cruise(StandList As String)
    Instructs the cruiser to cruise the List of stands given. Format for StandList is
    "Stand1;Stand2; . . . " where "Stand1", etc. is the name of individual stands to be
    cruised. The resulting volumes calculated from the scale is accessed through the
    VolumeCalculator object.
Events
Remarks
  • Cruise stands by calling the Cruise() member, passing a List of stands. Then access
    the resulting volume through the StandVolumes, TreeVolumes or LogVolumes
    objects. Remember to set which volume summaries will be valid using the TABLE 19-continued

| Cruiser object 84 |
|---|
| IsTallyStandVolumes, IsTallyTreeVolumes and IsTallyLogVolumes properties.<br>• The LogVolumes object can be given to Grader object 82 for grading. |

Rule Objects

Figure 7:
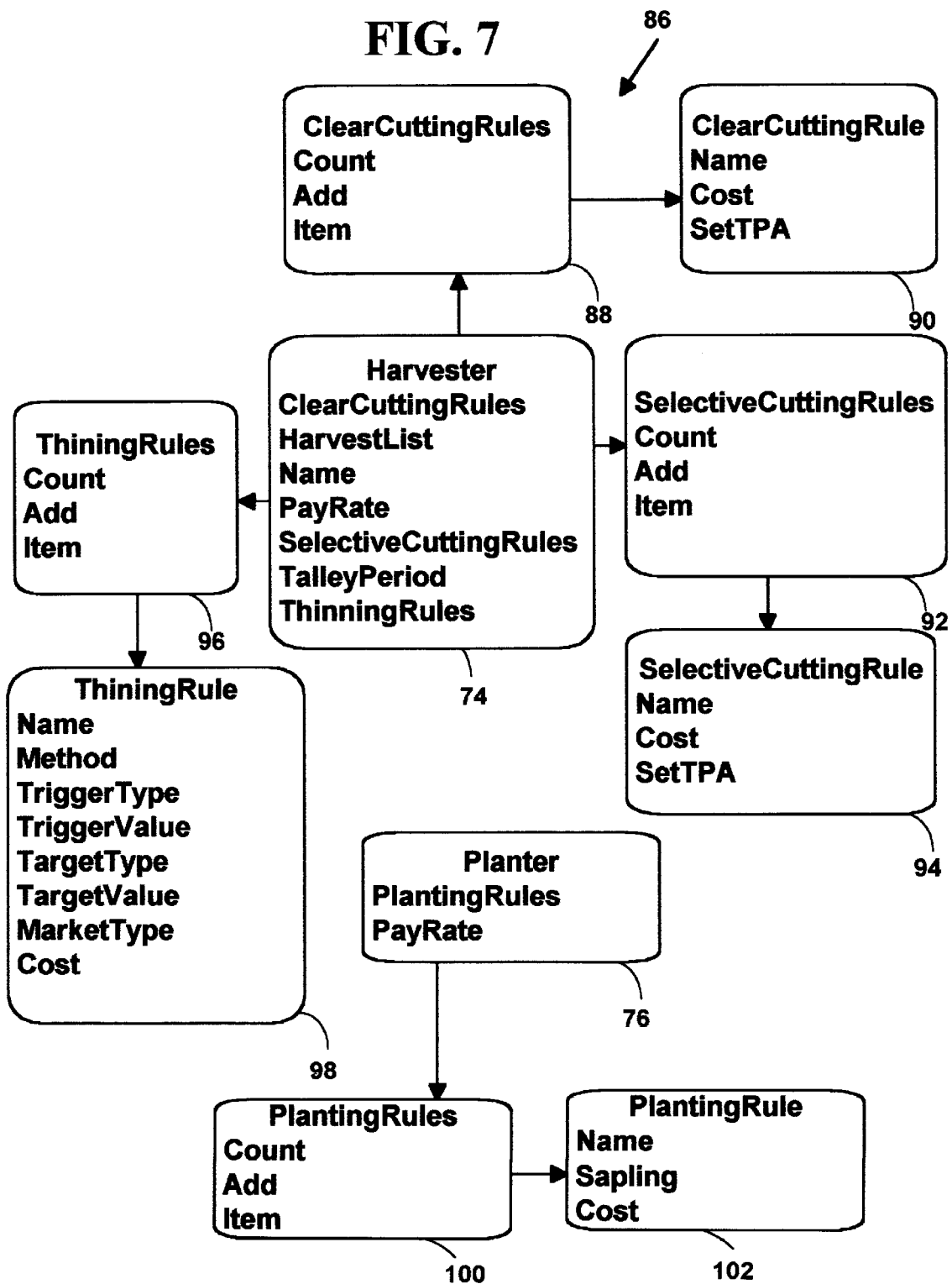
FIG. 7 is a block diagram illustrating Rule objects.

FIG. 7 is a block diagram illustrating Rule objects 86. Rule objects 86 define how the multiple management actions are carried out. Each management action has a rule associated with it that defines how the management action will be carried out. ClearcuttingRules object 88, ClearcuttingRule object 90, SelectiveCuttingRules object 92, SelectiveCuttingRule object 94 and ThinningRules object 96 and ThinningRule object 98 are stored in Harvester object 74.

Table 20 illustrates properties, methods and events of ClearcuttingRules object 88. However, more or fewer properties, methods and events could also be used.

TABLE 20

| ClearcuttingRules object 88 |
|---|
| Description<br>ClearcuttingRules object 88 implements a List of ClearcuttingRule objects 90. ClearcuttingRules object 88 is accessed through Harvester object 74.<br>Properties<br>  Count As Long<br>    Returns the number of ClearCuttingRule objects 90 in the List.<br>Methods<br>  Add() As ClearcuttingRule<br>    Creates a new ClearCuttingRule object 90 and adds it to the List. Returns the<br>    ClearCuttingRule object 90 created<br>  Item(Index As Long) As ClearcuttingRule<br>    Returns the ClearCuttingRule object 90 at the Index position in the list.<br>  RemoveAll()<br>    Removes all ClearCuttingRule objects 90 from the List.<br>Events<br>Remarks |

Table 21 illustrates properties, methods and events of ClearcuttingRule object 90. However, more or fewer properties, methods and events could also be used.

TABLE 21

| ClearcuttingRule object 90 |
|---|
| Description<br>ClearcuttingRule object 90 is a rule that defines how a clear cut action will be carried out. Clear cutting rules differ only by their cost, which is accounted for each time the rule is carried out. ClearCuttingRule objects 90 are stored in the ClearCuttingRules object 88which is accessed through Harvester object 74.<br>Properties<br>  Cost As Single<br>    Cost per acre for a clear cut action. Cost of clear cut is accounted for at the time of<br>    each clear cut action.<br>  Name As String<br>    Name of this clear cut rule.<br>  ID As Long<br>    Numeric ID uniquely identifying this clear cutting rule from other clear cutting rules.<br>Methods<br>Events<br>Remarks |

Table 22 illustrates properties methods and events of SelectivecuttingRules object 92. However, more or fewer properties, methods and events could also be used.

TABLE 22

SelectivecuttingRules 92

Description
SelectivecuttingRules object 92 holds a List of SelectivecuttingRule objects 94.
Properties
   Count As Long
      Returns the number of SelectivecuttingRule objects 94 in the List.
Methods
   Add() As SelectivecuttingRule
      Creates a new SelectiveCuttingRule object 94 and adds it to the List. Returns the
      SelectivecuttingRule object 94 created.
   Item(Index As Long) As SelectivecuttingRule
      Returns the SelectiveCuttingRule object 94 at the Index position in the List.
   RemoveAll()
      Removes all SelectiveCuttingRule objects 94 from the List.
Events
Remarks Table 23 illustrates properties, methods and events of SelectivecuttingRule object 94. However, more or fewer properties, methods and events could also be used.

TABLE 23

SelectivecuttingRule 94

Description
SelectivecuttingRule object 94 is a rule that defines how a selective cutting action will be carried
out: When selective cutting occurs, a size density curve is used to define the TPA of trees to
leave standing. The size density curve is set by calling the SetTPA() method.
Properties
   Cost As Single
      Cost per selective cutting action carried out.
   Name As String
      Name of this selective cutting rule.
   ID As Long
      Numeric ID uniquely identifying this selective cutting rule from other selective cutting
      rules.
Methods
   SetTPA(Points as String)
      Sets the minimum TPA curve
Events
Remarks Table 24 illustrates properties methods and events of ThinningRules object 96. However, more or fewer properties, methods and events could also be used.

TABLE 24

ThinningRules object 96

Description

ThinningRules object 96 holds a list of ThinningRule objects 98.
Properties

Count As Long
      Returns the number of ThinningRule objects 98 in the list.
Methods Add() As ThinningRule
      Creates a new ThinningRule object 98 and adds
      it to the list. Returns the ThinningRule
      object 98 created.
   Item(Index As Long) As ThinningRule
      Returns the ThinningRule object 98
      at the Index position in the List.

TABLE 24-continued

ThinningRules object 96

RemoveAll()
      Removes all ThinningRule objects 98 from the list.
Events
Remarks Table 25 illustrates properties, methods and events of ThinningRule object 98. However, more or fewer properties, methods and events could also be used.

TABLE 25

ThinningRule object 98

Description

ThinningRule object 98 is a rule that defines
how a thinning action will be carried out.
Properties Cost As Single
      Cost per thinning action carried out.

TABLE 25-continued

ThinningRule object 98

Name As String
    Name of this thinning rule.
Method As Long
    Thinning method.
TriggerType As Long
    Type of thinning trigger.
TriggerValue As Single
    Value of thinning trigger.
TargetType As Long
    Name of this thinning rule.
TargetValue As Single
    Value of thinning target.
MinimumMarker As Single
    Minimum value for thinning marker.
MaximumMarker As Single
    Maximum value for thinning marker.
MarkerType as Long
    Type of thinning marker.
Name As String
    Name of this thinning rule.
ID as Long
    Numeric ID uniquely identifying this
    thinning rule from other thinning rules.
Methods SetTPA(Points as String)
        Sets the minimum TPA curve
Events
Remarks PlantingRules object 100 and PlantingRules object 102 are stored in Planter object 76. When Harvester object 74 or Planter object 76 is told to carry out an action, it looks up the rule associated with that action in its list. Any number of rules can be made for each action.

Table 26 illustrates properties, methods and events of PlantingRules object 100. However, more or fewer properties, methods and events could also be used.

TABLE 26

PlantingRules object 100

Description

PlantingRules object 100 holds a list
of PlantingRule objects 102.
Properties

Count As Long
        Returns the number of PlantingRule objects
        102 in the list.
Methods Add() As PlantingRule
        Creates a new PlantingRule object 102
        and adds it to the list. Returns the
        PlantingRule object 102 created.
    Item(Index As Long) As PlantingRule
        Returns the PlantingRule object 102 at
        the Index position in the list.
    RemoveAll()
        Removes all PlantingRule objects 102 from the list.
Events
Remarks Table 27 illustrates properties, methods and events of PlantingRule object 102. However, more or fewer properties, methods and events could also be used.

TABLE 27

PlantingRule object 102

Description

PlantingRule object 102 is a rule that defines
how a planting action will be carried out.
Properties CostAsSingle
        Cost per planting action carried out.
    Name As String
        Name of this planting rule.
    ID As Long
        Numeric ID uniquely identifying this planting
        rule from all other planting rules.
    Saplings As TreeClasses object 56
        TreeClasses object 56 that defines what
        tree classes are planted when this rule is
        carried out.
Methods
Events Rules can also be specified by stand. Each Stand object 58 can have a default rule for each action associated with it. When no rule is specified for an action, the default rule for the stand applies. In addition to scheduled thinnings, the ForestManager object 68 assesses the density of stands each period to determine if a thinning is needed. If so, the Harvester object 74 is instructed to thin the stand using a default thinning rule for the stand.

Timber Assessment Objects

Figure 8A:
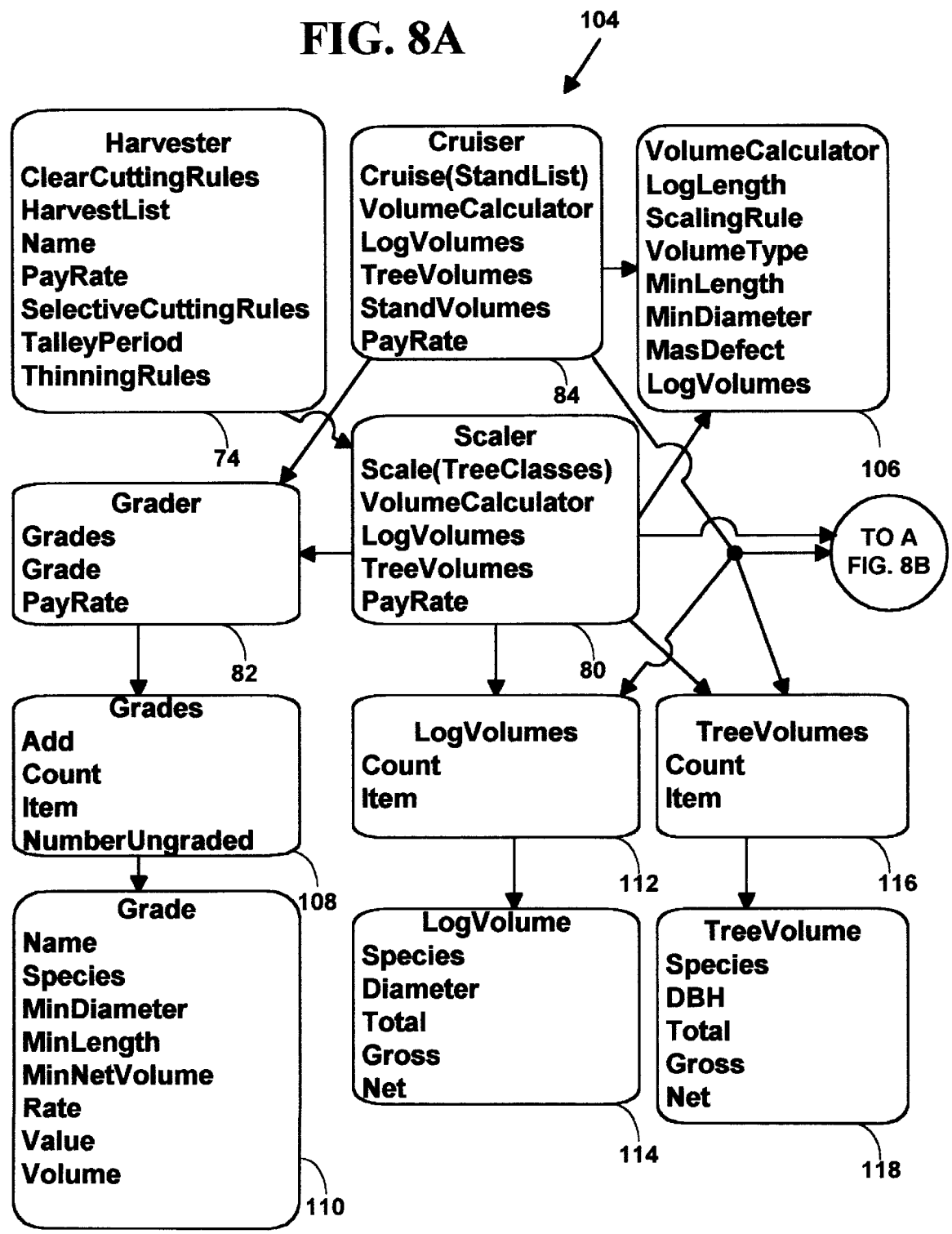
FIGS. 8A and 8B are a block diagram illustrating Timer Assessment objects.
Figure 8B:
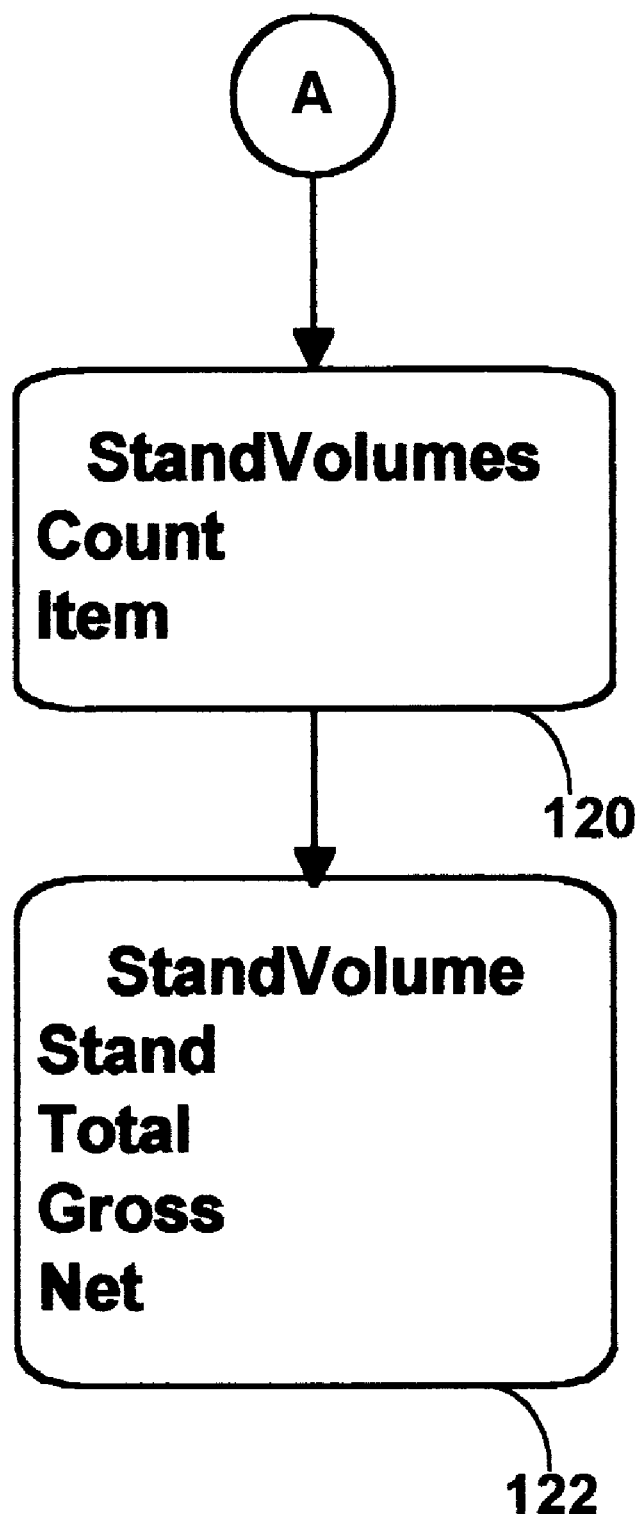

FIGS. 8A and 8B are a block diagram illustrating Timber Assessment objects 104. Timber Assessment objects 104 provide functionality for measuring the volume and value of timber. Cruiser object 84 calculates stand volume by "cruising" one or more stands using a VolumeCalculator object 106 in FIG. 8A. Cruising and volume calculation is known to those skilled in the forestry arts. Volume is tallied by stand, tree class or log class. Cruiser object's 64 Volume-Calculator object 106 is used to do the volume calculations and can be configured for a number of board feet and cubic feet measures.

Table 28 illustrates properties, methods and events of VolumeCalculator object 106. However, more or fewer properties, methods and events could also be used.

TABLE 28

Description

VolumeCalculator object 106 calculates the timber volume of
trees. Volume is calculated in cubic and board foot values.
Board foot values are calculated using Scribner Decimal C log
rules (e.g., Bell, 1988). Cubic foot volume is calculated
as a truncated cone (e.g., Bell, 1988). A minimum DBH for
merchantable trees, a minimum log diameter for merchantable
logs and the log length can be set to customize volume
calculations. Log scaling can be done using either Eastside
(rounding) or Westside (truncation) scaling rules. The
VolumeCalculator calculates the volume of trees one at a time.
These volumes are tallied in Logvolumes and TreeVolumes objects.
The volume calculation for each tree can be traced by catching
the VolumeCalculatorPostCalc event. This event passes the
last TreeClass whose volume was calculated and the number
individuals trees it represents.
Properties IsCalcEvent As Long
        Determines whether the VolumeCalculatorCalc
        event is raised for the next tree class
        calculated.

TABLE 28-continued

LogLength As Single
  Length of log to be used in segmenting a tree.
LogVolumes As Logvolumes
  A LogVolumes object that holds the LogVolume
  objects for the last calculated tree class.
MaxDefect As Single
  Maximum defect allowed for log to contribute
  volume to net volume tally.
MaxNetVolume As Single
  Minimum net volume of log for log to contribute
  volume to net volume tally.
MinDiameter As Single
  Minimum log diameter for log to contribute
  volume to gross volume tally.
MinLength As Single
  Minimum log length for log to contribute
  volume to gross volume tally.
VolumeType As Long
  Type of volume to calculate.
ScalingRule As Long
  Scaling rule to be used in volume calculations.
  1 - Westside scaling rules. Log diameters are
  truncated to the nearest inch.
  2 - Eastside scaling rules. Log diameters are
  rounded to the nearest inch.
Events VolumeCalculatorPreCalc
  (TreeClass As TreeClass, TreeCount As Double)
    Triggered before the VolumeCalculator
    calculates the volume of a tree.
  VolumeCalculatorpostCalc
  (TreeClass As TreeClass, TreeCount As Double)
    Triggered after the VolumeCalculator calculates
    the volume of a tree. Sample the CurrentLogvolumes
    member to determine the volume of each log in the
    TreeClass given.
Remarks

* VolumeCalculator object 106 is an object member
  of both Cruiser object 84 and Scaler object 80 Prior to
  instructing Cruiser object 84 or Scaler object 80 to
  calculate volume, the LogLength, MinDBH, MinLogDiameter
  and ScalingRule properties of their respective
  VolumeCalculators are set.
  * Cruiser object 84 and Scaler object 80 are told what
  types of categories VolumeCalculator object 106 is to
  tally volume into: tree classes, log classes or both.

After Harvester object 74 harvest trees, Scaler object 80 calculates the volume of timber in the harvested trees using a traditional volume calculations known to those skilled in the forestry arts. Scaler object 80 determines harvested volume using VolumeCalculator object 106 with a HarvestedTreeClasses object member from a HarvestList object member generated by Harvester object 74 after a harvest. Scaler object's 80 VolumeCalculator object 106 can be configured the same way as the Cruiser object's 84 VolumeCalculator object 106.

Grader object 82 calculates the value of timber volumes using a traditional log grading system known to those skilled in the forestry arts. Grader object 82 grades harvested timber using LogVolumes object 112 of the Scaler object 80 with Grades object 108 and Grade object 110. The resulting list of grades returns the volume and value of the harvested timber by grade. The value can be added to the organization's income using Accountant object 78.

Table 29 illustrates properties, methods and events of Grades object 108. However, more or fewer properties, methods and events could also be used.

TABLE 29

Grades object 108

Description

Grades object 108 implements a list of Grade
objects 110. Grader object 82 uses Grades object
108 to grade log volumes. Grades should be entered
in order of decreasing value.
Properties Count As Long
    Returns the number of Grade objects 110 in the list.
  NumberUngraded As Long
    Returns the number of LogVolume objects that did
    not match any Grade objects 110 during grading.
    LogVolume objects that remain ungraded do not
    contributed to grade volume or value.
  Volume As Single
    Returns the volume of Grade objects 110 in the
    list. This will only be valid after a grading has occurred.
  Value As Single
    Returns the value of Grade objects 110 in the list.
    This will only be valid after a grading has occurred.
Methods Add() As Grade
    Creates a new Grade object 110 and adds it to
    the list. Returns the Grade object 110 created.
  Item(Index As Long) As Grade
    Returns the Grade object 110 at the Index
    position in the list.
  RemoveAll()
    Removes Grade objects 110 from the list.
Events
Remarks

* Grader object 82 attempts to match Grade object
  110 from the first in the list to the last.
  The first Grade object whose specifications match
  the LogVolume object in question is used to assign
  a grade to the LogVolume object. Therefore, that Grade
  objects 110 are entered in decreasing value with the
  first entered having the highest value and the last
  entered having the lowest value.

Table 30 illustrates properties, methods and events of Grade object 110. However, more or fewer properties, methods and events could also be used.

Grade object 110

Description

Grade object 110 holds grade specifications that are
used to implement log grading. Using grades, timber
value can be assessed.
Properties MaxDefect As Single
    The maximum defect that a log may have
    to contribute volume to this grade.
  MinDiameter As Long
    The minimum diameter that a log should
    have to contribute volume to this grade.
  MinLength As Long
    The minimum length that a log should have
    to contribute volume to this grade.
  MinNetVolume As Single
    The minimum net volume a log should have
    to contribute volume to this grade.
  Name As String
    The name of the grade.
  Rate As Single
    Value per unit volume for this grade.
    After Grader object 82 calculates grades, the
    value of a grade becomes the volume of the -continued Grade object 110 grade multiplied by the rate.
Species As String
    Species object for this grade.
Value As Single
    Value for the volume in this grade.
Volume As Single
    The volume of timber in this grade.
Methods
Events
Remarks \* A grade is uniquely defined by its name,
species, minimum diameter and minimum
length specifications.

The volume of wood present in logs is determined by Scaler object 80 and Cruiser object 84 using a VolumeCalculator object 106 with a LogVolumes object 116 including a LogVolume object 118.

Table 31 illustrates, properties methods and events of LogVolumes object 112. However, more or fewer properties, methods and events could also be used.

TABLE 31

Logvolumes object 112

Description

LogVolumes 112 object holds a list of LogVolume
objects 114. An index is used to access objects
in the list.
Properties Net As Single
        Net volume.
    Count As Long
        The number of LogVolume objects 114 in the list.
    Gross As Single
        Gross volume.
    Total As Single
        Total volume.
Methods Item(Endex As Long) As LogVolume
        Returns the Logvolume object 114 with the index given.
Events
Remarks Table 32 illustrates properties, methods and events of LogVolume object 114. However, more or fewer properties, methods and events could also be used.

TABLE 32

Logvolume object 114

Description

LogVolume object 114 holds the volume of timber tallied
into log classes. Species, diameter and length uniquely
define log classes. Volume is available in cubic and
boardfoot values. Board foot values is calculated
using Scribner Decimal C log rules. (e.g., Bell,
1988) Cubic foot volume is calculated as a truncated cone.
Properties Diameter As Long
        Diameter of this log volume class.
    Gross As Single
        Gross volume.
    Length As Long
        Length of this log volume class.

TABLE 32-continued

Logvolume object 114

Net As Single
        Net volume.
    Species As String
        Species of this log volume class.
    Total As Single
        Total volume.
Methods
Events
Remarks The volume of wood present in trees is determined by Scaler object 80 and Cruiser object 84 using a VolumeCalculator object 106 with a TreeVolumes object 116 including a TreeVolume object 118. Table 33 illustrates properties, methods and events of TreeVolumes object 116. However, more or fewer properties, methods and events could also be used.

TABLE 33

TreeVolumes object 116

Description

TreeVolumes object 116 holds a list of Treevolume
objects 118. An index is used to access
objects in the list.
Properties Age As Single
        Average age of tree classes. Read only.
    BA As Single
        If TreeVolume objects 118 are derived from
        Cruiser calculations, the BA is BA per acre. If
        TreeVolume objects 118 are a result of Scaler
        calculations, then BA is total BA for trees
        harvested. Read only.
    Count As Long
        The number of TreeVolume objects 118
        in the list. Read only.
    DBH As Single
        Returns the arithmetic average DBH of
        TreeVolume objects 118 in the list. Read only.
    Gross As Single
        Gross volume. Read only.
    Net As Single
        Net volume. Read only.
    Total As Single
        Total volume. Read only.
    HeightTotal As Single
        Average total height. Read only.
    Sort(Type as Long)
        Sorts the list of TreeVolumes objects 116.
        Type interpreted as a bit filed where bit 1
        sorts by species and bit 2 sorts by DBH.
        Sorting order parallels bit order.
    TPA As Single
        Trees per acre. Invalid if TreeVolumes
        object 116 when derived from Scaler object
        80. Read only.
    TreeCount As Single
        Trees per acre. Valid if TreeVolumes
        object 116 when derived from Scaler object 80
        Read only.
    QMD As Single
        Returns the quadratic mean diameter or
        the DBH of a tree with average BA. Read only.
Methods Item(Index As Long) As StandVolume
        Returns StandVolume object with the index given.
Events
Remarks Table 34 illustrates properties, methods and events of TreeVolume object 118. However, more or fewer properties, methods and events could also be used.

TABLE 34

TreeVolume object 118

Description

TreeVolume object 118 holds the volume of timber tallied by stand. Species and DBH uniquely define TreeVolume objects 118 within TreeVolumes object 116.
Properties Age As Single
        Average age of tree classes.
    BA As Single
        Average BA per acre.
    DBH As Single
        DBH.
    Gross As Single
        Gross volume.
    Net As Single
        Net volume.
    Species As String
        Species.
    Total As Single
        Total volume.
    HeightTotal As Single
        Average total height.
    TPA As Single
        Trees per acre. Invalid if TreeVolume object
        118 when derived from Scaler object 80.
    TreeCount As Single
        Trees per acre. Valid if TreeVolume object 118
        when derived from Scaler object 80.
Methods
Events
Remarks The volume of timber present in a stand is determined by Cruiser object 84 using a VolumeCalculator object 106 with a StandVolumes object 120 including a StandVolume object 122 (FIG. 8B).

Table 35 illustrates properties, methods and events of StandVolumes object 120. However, more or fewer properties, methods and events could also be used.

TABLE 35

StandVolumes 120

Description

StandVolumes object 120 holds a list of StandVolume objects 122. An index is used to access objects in the list.
Properties Age As Single
        Average age of tree classes. Read only.
    BA As Single
        Average BA per acre. Read only.
    Count As Long
        The number of StandVolume objects 122
        in the list. Read only.
    Gross As Single
        Gross volume. Read only.
    Net As Single
        Net volume. Read only.
    Total As Single
        Total volume. Read only.
    TotalHeight As Single
        Average total height. Read only.
    TPA As Single
        Trees per acre. Read only.

TABLE 35-continued

StandVolumes 120

Methods
    Item(Index As Long) As StandVolume
        Returns StandVolume object 122 with the index given.
Events
Remarks Table 36 illustrates properties, methods and events of StandVolume object 122. However, more or fewer properties, methods and events could also be used.

StandVolume object 122

Description

Figure 9:
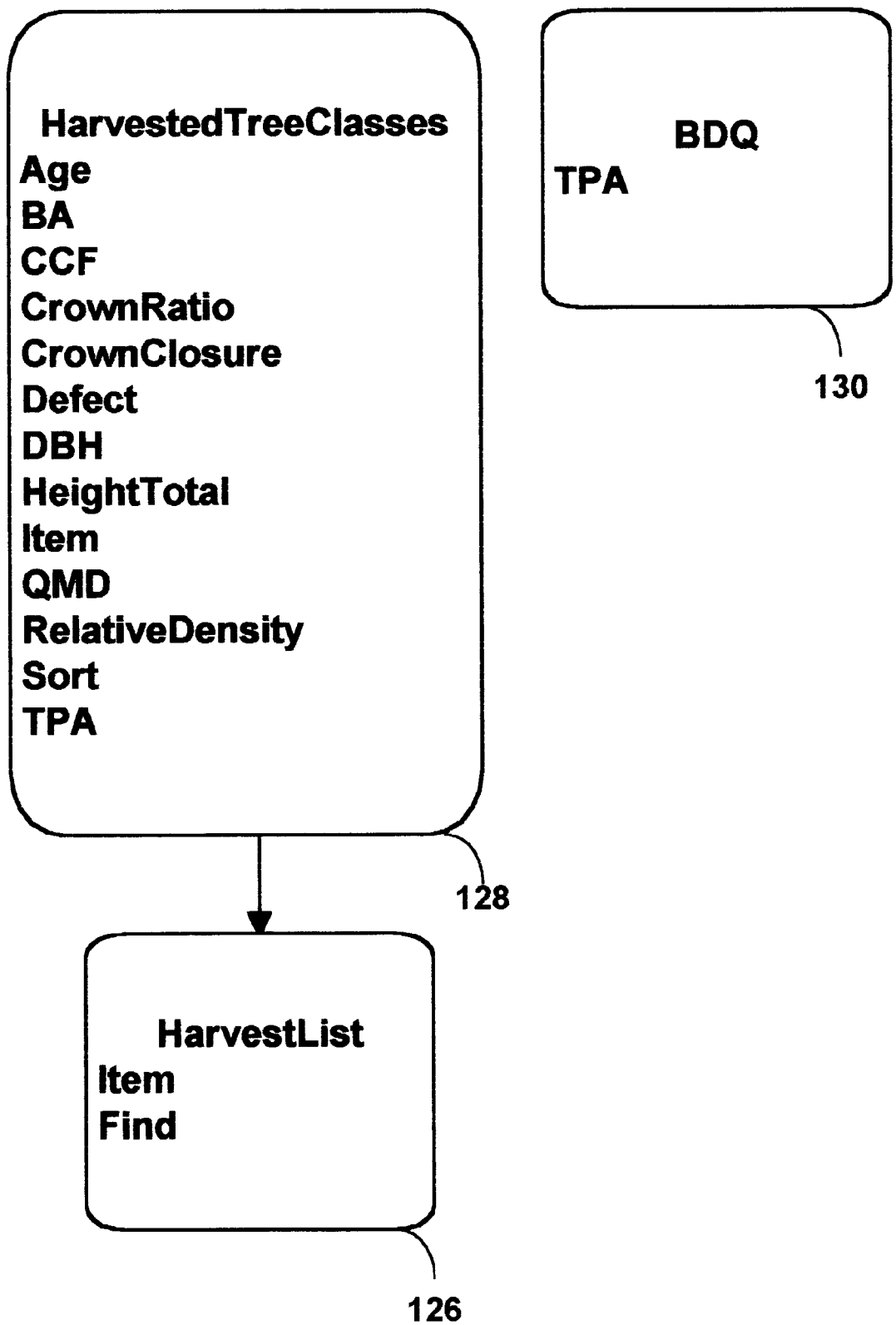
FIG. 9 is a block diagram illustrating additional Forest Simulation objects.

StandVolume object 122 holds the volume of timber tallied by stand. Stand name uniquely define StandVolume objects 122 within the StandVolumes object 120.
Properties Age As Single
        Average age of tree classes. Read only.
    BA As Single
        BA per acre. Read only.
    Gross As Single
        Gross volume. Read only.
    Net As Single
        Net volume. Read only.
    Stand As String
        Name of stand this StandVolume object 122
        represents. Read only.
    Total As Single
        Total volume. Read only.
    TotalHeight As Single
        Average total height. Read only.
    TPA As Single
        Trees per acre. Read only.
    QMD As Single
        Quadratic mean diameter or the DBH of a tree
        with average BA. Read only.
Methods
Events
Remarks FIG. 9 is a block diagram 124 illustrating additional Forest Simulation objects including a HarvestList object 126, HarvestedTreeClass object 128, and a BDQ object 130. Harvester 74 uses HarvestList object 126 and HarvestedTreeClasses object 128 to summarize harvested by stand after a harvest. HarvestList object 126 includes a list of HarvestedTreeClasses objects 128 in a list. HarvestedTree-Classes object 128 includes a list of harvested TreeClass objects 54. BDQ object 130 provides a TPA versus DBH for a set of TreeClass objects 54.

Table 37 illustrates properties, methods and events of HarvestList object 126. However, more or fewer properties, methods and events could also be used.

TABLE 37

HarvestList object 126

Description

List of HaverstedTreeClasses objects 128 in the harvest list.
Properties

Count As Long
        Returns the number of HarvestedTreeClasses

TABLE 37-continued

HarvestList object 126 objects 128 in the harvest list.
Methods

Item(Index as Long) As HarvestedTreeClasses
        Returns the HarvestedTreeClasses object
        128 with the index given.
    Find(Stand as String) As HarvestedTreeClasses
        Returns the HarvestedTreeClasses object
        128 that corresponds to the stand given.
Events
Remarks Table 38 illustrates properties, methods and events of HarvestedTreeClasses object 128. However, more or fewer properties, methods and events could also be used.

TABLE 38

HarvestedTreeClasses object 128

Description

List of harvested TreeClasses objects 56.
Properties

Count As Long
        Returns the number of TreeClasses
        objects 56 in the list.
    Stand As String
        Returns the name of the stand to which
        this HarvestedTreeClasses object 128 corresponds
Methods Age as Long
        Average age of tree class objects in the list.
    BA As Single
        Sum of basal area for tree class
        objects in the list.
    CCF(DBH) As Single
        Crown competition factor for trees with
        DBH larger than that given (e.g., krajicek et.
        al.,1961). Calculated as:
            $CCF = \Sigma(CW_i^2 * TPA_i)*\pi/4/43560$
        Where i denotes the $i^{th}$ tree class object in
        the list with DBH larger than MinDBH
    CrownRatio() As Single
        Average crown ratio weighted by TreeCount.
    CrownClosure(DBH) As Single
        Crown competition factor for trees with
        HeightTotal > Height. Calculated similarly as
        CCF.
    Defect As Single
        Returns the % defect for tree class object in the list.
    DBH As Single
        Returns the arithmetic average DBH of
        tree class objects in the list.
    HeightTotal As Single
        Average total height of tree class objects in the list.
    Item(Index As Long) As Object
        Returns the tree class object at the
        Index position in the list.
    QMD As Single
        Quadratic mean diameter or the DBH of a
        tree with average BA. Calculated as:
        When TreeClasses object represents standing trees:
            $QMD = BA/TPA*4*144/\pi$
        When TreeClasses object represents cut trees:
            $QMD = BA/TreeCount*4*144/\pi$
    RelativeDensity As Single
        Relative density (e.g., Curtis 1982). Calculated as:
            $RelativeDensity = BA/QMD^{1/2}$.
    Sort(Type as Long)
        Sorts the tree class objects in the list.
        Type interpreted as a bit filed where bit 1 sorts

TABLE 38-continued

HarvestedTreeClasses object 128 by species and bit 2 sorts by DBH. Sorting order
        parallels bit order.
    TPA(MinDBH As Single, MaxDBH As Single) As Single
Events
Remarks Table 39 illustrates properties, methods and events of BDQ object 130. However, more or fewer properties, methods and events could also be used.

TABLE 39

BDQ object 130

Description

BDQ object 130 provides a TPA versus DBH
for a set of TreeClass objects 54.
Members TPA(long MinDBH, long MaxDBH) as Single
        Returns a TPA for classes of trees between
        MinDBH and MaxDBH.
Remarks

* BDQ averages DBH to the nearest whole #.
    For example, a TreeClass 54 with DBH
    = 12.7 will be reported by BDQ as a 13 inch TreeClass.

Environmental Quality Objects

Figure 10:
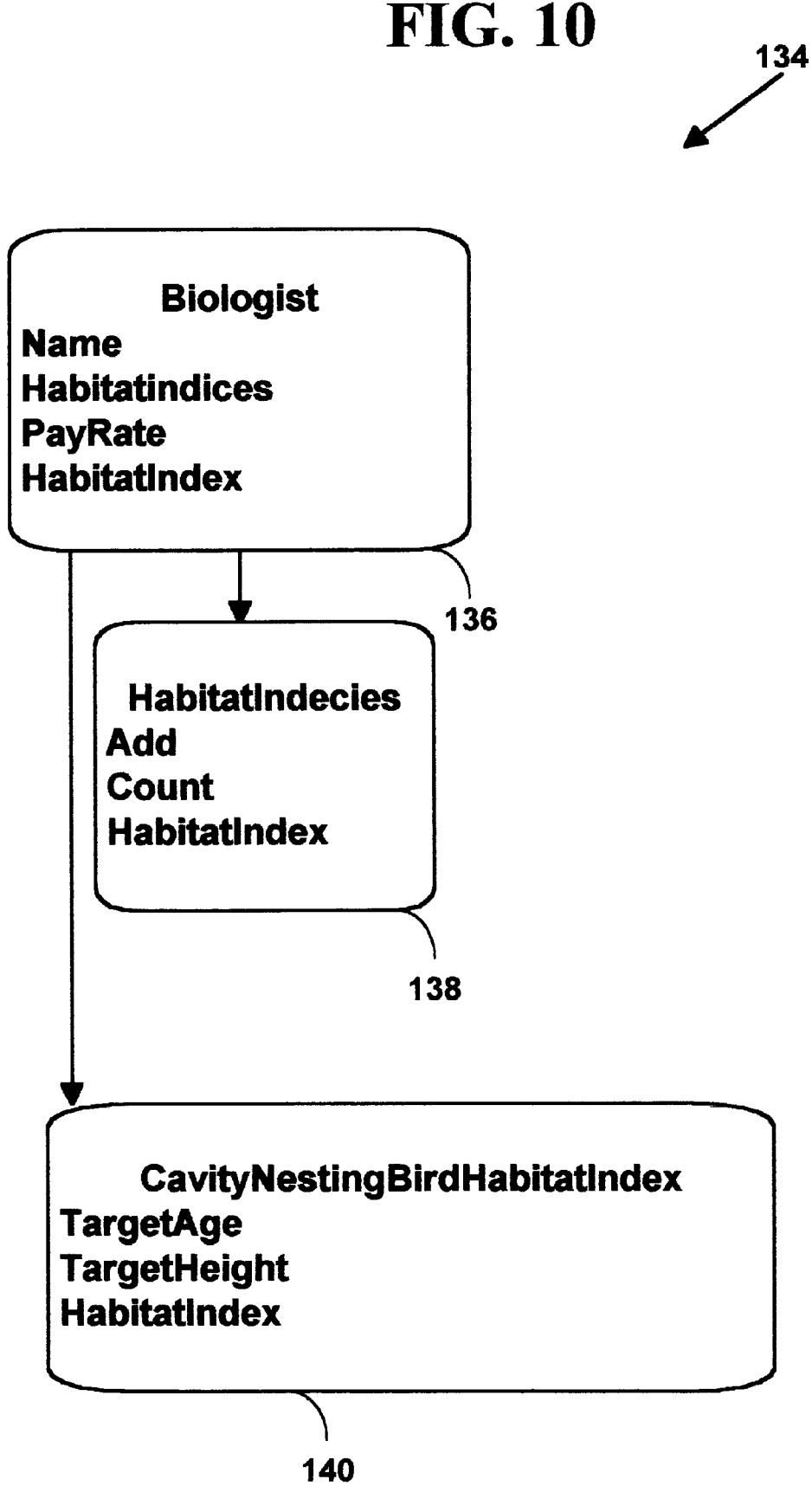
FIG. 10 is a block diagram illustrating Environment Quality objects.

In an illustrative embodiment of the present invention, quality of a simulated forested environment can also be assessed using one or more Environmental Quality objects 134. FIG. 10 is a block diagram illustrating Environmental Quality objects 134. Environmental Quality objects include a Biologist object 136, a HabitatIndices object 138 and a CavityNestingBirdHabitatIndex object 140.

Biologist object 136 calculates the quality of habitat for specific species using HabitatIndices object 138. Biologists object 136 HabitatIndices object member holds the results of habitat quality calculations. CavityNestingBirdHabitatIndex object 140 is a habitat index for birds that prefer a specific habitat in stands in older growth forests. However, other objects for other biological species besides birds could also be used by Biologist object 136.

Table 40 illustrates properties, methods and events of Biologist object 136. However, more or fewer properties, methods and events could also be used.

TABLE 40

Biologist object 136

Description

Biologist object 136 samples stands for habitat quality
by calculating indices that reflect the quality of habitat
for a certain species. Habitat Indices can be calculated
for any number of stands.
Members Name as String
        User supplied name of object.
    HabitatIndices as HabitatIndicies
        List of HabitatIndicies objects to
        calculate. Read only.
    PayRate as Float
        Rate of pay for each stand sampled.
        Billed to organization after completing sample.

TABLE 40-continued

Biologist object 136

HabitatIndex as Sample(string StandList)
  Instructs the Biologist to calculate the
  habitat indices defined in the HabitatIndices
  object for the stands given. Format for StandList
  is "Stand1;Stand2;. . . " where "Stand1",
  etc. is the name of individual stands to be sampled.
  The habitat indices calculated from the sample is
  returned through a HabitatIndices object 138.
Remarks

* Set up habitat index objects using the
  HabitatIndices object member, then call
  Sample() to calculate them.
  * Loop through the habitat index objects in the
  HabitatIndices object 138 to access the
  value of the indices.

Table 41 illustrates properties, methods and events of HabitatIndices object 138. However, more or fewer properties, methods and events could also be used.

TABLE 41

HabitatIndices object 138

Description

HabitatIndices object 138 holds a list of habitat index objects.
Members

Add(long Type)
    Creates a new habitat index object of the
    type specified and adds it to the list.
    Returns the habitat index object created.
  Count as Long
    Returns the number of habitat
    index objects in the list.
  HabitatIndex as Item(long Index)
    Returns the habitat index object
    at the Index position in the list.
Remarks Table 42 illustrates properties, methods and events of CavityNestingBirdHabitatIndex object 140. However, more or fewer properties, methods and events could also be used.

TABLE 42

CavityNestingBirdHabitatIndex 140

Description

CavityNestingBirdHabitatIndex object 140 is a habitat
index for birds that prefer habitat in stands with
older growth. The index is calculated as:
Index = stand average height/TargetHeight*stand average age/
TargetAge*stand area.
Members TargetAge as Float
    Ideal tree age for cavity nesting bird habitat.
  TargetHeight as Float
    Ideal tree height for cavity nesting bird habitat.
  HabitatIndex as Float
    Value of habitat index.
Remarks

* Access HabitatIndices object 138 through the
  HabitatIndices member of Biologist object 136.
  * Set the target age and height. After calling the
  Sample object member Biologist object 136 the

TABLE 42-continued

CavityNestingBirdHabitatIndex 140

HabitatIndex member will be set with the value
for this index.

Implementation

An illustrative embodiment of the present invention includes components written in Visual C++, Visual Basic, ActiveX and OLE all by Microsoft Corporation of Redmond, Wash. The components are used on a Windows 95 or Windows NT operating systems by Microsoft. However, the present invention is not limited to these programming languages, development environments or operating systems, and others can also be used. An object-oriented library of objects including the object-oriented objects illustrated in Tables 1–42 is included with an illustrative embodiment of the present invention.

A forestry simulation is typically conducted on large number of stands over a long pre-determined time period such as 100 years. The forestry simulation typically includes simulating the growth of hundreds of thousands of trees with TreeClass objects 54.

FIG. 11 is a block diagram illustrating an exemplary screen display 142 for an exemplary forestry simulation for an illustrative embodiment of the present invention. Screen display 142 includes first window 144 illustrating a screen display for the Simulation Control object, a second window 146 illustrating a screen display for forest resources including standing volume by stand, tree class and log viewer and a third window 148 illustrating a screen display for management actions applied to the forest resources. Second window 146 includes Douglas Fir and Grand Fir simulated trees in a simulated stand using one or more of TaperTreeClass object, or Stand object 58. Third window 148 includes management actions of clear cut, plant and thin applied to the forest resources of trees and stands in second window 146 using one or more of ClearCuttingRule object 90, ThinningRule object 98 or PlantingRule object 102.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. A computer executable method for simulating forest resources and management of the forest resources, the method comprising the following steps:

maintaining a database containing a description of a plurality of forest resources and a description of plurality of management actions for managing the plurality of forest resources;

constructing an object-oriented forest resource model from the plurality of forest resources;

constructing an object-oriented management action model from the plurality of management actions, wherein the object-oriented management action model is used to manage the plurality of forest resources;

initiating a simulation of forest resources over a pre-determined period of time using the object-oriented forest resource model; and periodically applying the object-oriented management action model to the forest resources from the object-oriented forest resource model being used in the simulation.

2. A computer readable medium having stored therein instructions for causing a central processing unit to execute the steps of the method of claim 1.

3. The method of claim 1 wherein the description of a plurality of forest resources includes descriptions of any of trees, stands, tree growth parameters, stand growth parameters or wildlife as computer readable data stored in the database.

4. The method of claim 1 wherein the description of plurality of management actions includes descriptions of accounting practices or forestry management practices including any of cruising, grading, harvesting, planting, or scaling as computer readable data stored in the database.

5. The method of claim 1 wherein the object-oriented forest resource model includes any of Stand or TreeClass object-oriented objects.

6. The method of claim 5 wherein the TreeClass object-oriented object includes a ConeTreeClass and a TaperTreeClass object-oriented object.

7. The method of claim 1 wherein the object-oriented management action model includes any of Accountant, Biologist, Forest Manger, Cruiser, Grader, Harvester, Planter, or Scaler object-oriented objects.

8. The method of claim 1 wherein the step of initiating a simulation of forest resources over a pre-determined period of time using the object-oriented forest resource model includes initiating a simulation with a Simulation Control object-oriented object.

9. A computer executable method for simulating forest resources and management of the forest resources over a pre-determined period of time, the method comprising the following steps:

opening an accounting on a plurality of simulated stands;

simulating a growing of a plurality of simulated trees on a plurality of simulated stands;

applying a plurality of forest management actions to the plurality of simulated trees on the plurality of simulated stands; and closing the accounting on the plurality of simulated stands.

10. A computer readable medium having stored therein instructions for causing a central processing unit to execute the steps of the method of claim 9.

11. The method of claim 9 wherein applying a plurality of forest management actions include applying forest management actions with a Forest Manager, Cruiser, Grader, Harvester, Planter, or Scaler object-oriented object.

12. The method of claim 9 wherein the forest resources include any of tree, stand, tree growth parameters, stand growth parameters or wildlife.

13. The method of claim 9 wherein the opening an accounting and closing the accounting steps includes opening an accounting and closing an accounting with an Accountant object-oriented object.

14. The method of claim 9 wherein the step of simulating a growing of a plurality of simulated trees on a plurality of simulated stands includes simulating a growing of a plurality of simulated trees on a plurality of simulated stands with a TreeClass and Stand object-oriented objects.

15. The method of claim 14 wherein the TreeClass object-oriented object includes any of a ConeTreeClass or a TaperTreeClass object-oriented object.

16. The method of claim 9 further comprising:

determining a simulated environmental quality for the plurality of simulated trees on the plurality of simulated stands.

17. The method of claim 16 wherein the step of determining a simulated environmental quality for the plurality of simulated trees on the plurality of simulated stands includes determining a simulated environmental quality with a Biologist object-oriented object.

18. The method of claim 9 further comprising:

determining simulated tree mortality for the plurality of simulated trees on the plurality of simulated stands before closing the accounting on the plurality of simulated stands.

19. A computer readable medium having stored therein a plurality of object-oriented data structures for forest simulation including an object-oriented library the forest simulation including a plurality of simulated trees in a plurality of simulated stands, the computer readable medium comprising:

Accountant object-oriented object, for tracking cash flow during a forest simulation;

Action object-oriented object, for specifying a forest management action to perform;

Actions object-oriented object, for maintaining a list of Action object-oriented objects;

BDQ object-oriented object, for providing a trees per acre versus diameter at breast height for trees in a stand;

Biologist object-oriented object, for calculating habitat quality indices for stands;

CavityNestingBirdHabitatIndex object-oriented object, for storing a habitat index for birds that prefer habitat in stands with older growth trees;

ClearCuttingRule object-oriented object, for defining how a clear cut action will be carried out;

ClearCuttingRules object-oriented object, for maintaining a list of ClearCuttingRule object-oriented objects;

ConeTreeClass object-oriented object, for representing a plurality of individual trees of a same species and diameter at breast height classes whose shape is described by a cone with base diameter equal to diameter at breast height and height equal to total height;

Cruiser object-oriented object, for calculating a volume of standing trees in a stand;

ForestControl object-oriented object, for accessing top other object-oriented objects in the object-oriented library;

ForestManager object-oriented object, for coordinating forest management activities;

Grade object-oriented object, for maintaining grade specifications used to implement log grading;

Grader object-oriented object, for grading and valuing timber volume;

Grades object-oriented object, for maintaining a list of Grade object-oriented objects;

HabitatIndices object-oriented object, for maintaining a list habitat indexes;

Harvester object-oriented object, for harvesting timber in a stand;

HarvestList object-oriented object, for maintaining a list of stands that were harvested;

HarvestedTreeClasses object-oriented object, for maintaining a list of harvested trees;

LogVolume object-oriented object, for maintaining a volume of timber tallied into log classes;

LogVolumes object-oriented object, for maintaining a list of LogVolume object-oriented objects;

Organization object-oriented object, for maintaining an organization that manages forested land;

Ownership object-oriented object, for maintaining a list of stands owned by an Organization object-oriented object;

Planter object-oriented object, for planting trees according to a list of saplings;

PlantingRule object-oriented object, for defining how a planting action will be carried out;

PlantingRules object-oriented object, for maintaining a list of PlantingRule object-oriented objects;

Scaler object-oriented object, for calculating volumes of trees;

SelectiveCuttingRule object-oriented object, for defining how a selective cutting action will be carried out;

SelectiveCuttingRules object-oriented object, for maintaining a list of SelectiveCuttingRule object-oriented objects;

Simulation Control object-oriented object, for starting, stopping and stepping through forest simulations;

Stand object-oriented object, for containing a list of trees on a stand;

Stands object-oriented object, for maintaining a list of Stand object-oriented objects;

StandVolume object-oriented object, for maintaining a volume of timber tallied by stand;

StandVolumes object-oriented object, for maintaining a list of StandVolume object-oriented objects;

TaperTreeClass object-oriented object, for representing a number of individual trees of a same species and diameter at breast height classes whose shape is described by a table of taper values;

ThinningRule object-oriented object, for defining how a thinning action will be carried out;

ThinningRules object-oriented object, for a maintaining list of ThinningRule object-oriented objects;

TreeClass object-oriented object, for defining a base set of object-oriented properties, methods and events for trees that other more specialized classes of trees implement;

TreeClasses object-oriented object, for maintaining a list of TreeClass object-oriented objects;

TreeVolume object-oriented object, for maintaining a volume of timber tallied by tree;

TreeVolumes object-oriented object, for maintaining a list of TreeVolume object-oriented objects; and VolumeCalculator object-oriented object, for calculating a timber volume of trees.

20. A computer readable medium having stored therein a Stand object-oriented data structure for simulating a forest stand with a plurality of simulated trees, the Stand object-oriented data structure including a plurality of object-oriented data structure members, the computer readable medium comprising:

object-oriented data structure member for an area of a stand;

object-oriented data structure member for a name of a stand;

object-oriented data structure member for tree classes present in a stand; and object-oriented data structure member for a site index.

21. A computer readable medium having stored therein an object-oriented data structure for calculating a volume of simulated trees in a simulated forest stand, the object-oriented data structure including a plurality of object-oriented data structure members, the computer readable medium comprising:

object-oriented data structure member for calculating timber volume;

object-oriented data structure member for tallying timber volume into log classes;

object-oriented data structure member for tallying timber volume into tree classes; and object-oriented data structure member for tallying timber volume by stand.

22. The computer readable medium of claim 21 wherein the object-oriented data structure includes any of Cruiser or Scaler object-oriented objects.

* * * * *